United States Patent
Kobayashi

(10) Patent No.: US 10,877,061 B2
(45) Date of Patent: Dec. 29, 2020

(54) MEASUREMENT INSTRUMENT, MEASUREMENT METHOD, MEASUREMENT SYSTEM, AND PROGRAM

(71) Applicant: Seiko Epson Corporation, Tokyo (JP)

(72) Inventor: Yoshihiro Kobayashi, Komagane (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/374,163

(22) Filed: Apr. 3, 2019

(65) Prior Publication Data

US 2019/0227095 A1 Jul. 25, 2019

Related U.S. Application Data

(62) Division of application No. 15/272,862, filed on Sep. 22, 2016, now abandoned.

(30) Foreign Application Priority Data

Oct. 2, 2015 (JP) .................................. 2015-196615
Oct. 2, 2015 (JP) .................................. 2015-196618

(51) Int. Cl.
| | |
|---|---|
| *G01P 13/00* | (2006.01) |
| *G01N 29/04* | (2006.01) |
| *G01M 5/00* | (2006.01) |
| *G06K 9/00* | (2006.01) |

(52) U.S. Cl.
CPC ........... *G01P 13/00* (2013.01); *G01M 5/0066* (2013.01); *G01N 29/04* (2013.01); *G06K 9/00791* (2013.01)

(58) Field of Classification Search
CPC .. G01N 29/11; G01N 29/44; G01N 2291/015; G01N 2291/0289; G01N 29/04; G01P 3/02; G01P 3/64; G01M 5/0066; G06K 9/00791

See application file for complete search history.

(56) References Cited

U.S. PATENT DOCUMENTS

| | | | | |
|---|---|---|---|---|
| 6,556,927 | B1 * | 4/2003 | Latta .................... | G01G 19/024 177/210 EM |
| 9,267,862 | B1 * | 2/2016 | Kavars ................ | G01M 5/0033 |
| 9,772,237 | B1 * | 9/2017 | Bednarz ................. | G01L 25/00 |
| 2002/0092359 | A1 * | 7/2002 | Lange ................... | G01Q 20/04 73/779 |
| 2012/0067124 | A1 * | 3/2012 | Zolfagharkhani . | G01C 19/5733 73/579 |
| 2012/0173171 | A1 * | 7/2012 | Bajwa ................... | G01H 11/06 702/56 |

(Continued)

FOREIGN PATENT DOCUMENTS

| | | |
|---|---|---|
| JP | 62-088098 A | 4/1987 |
| JP | 2002-523767 A | 7/2002 |

(Continued)

*Primary Examiner* — Stephanie E Bloss
(74) *Attorney, Agent, or Firm* — Harness, Dickey & Pierce, P.L.C.

(57) ABSTRACT

An acquisition unit acquires at least one of the vertical-direction acceleration and the width-direction acceleration of a surface of a structure on which a moving object moves from an acceleration sensor provided in the structure on which the moving object moves. An analysis unit analyzes the motion of the moving object moving on the structure on the basis of at least one of the vertical-direction acceleration and the width-direction acceleration.

18 Claims, 20 Drawing Sheets

(56) References Cited

U.S. PATENT DOCUMENTS

| | | | | |
|---|---|---|---|---|
| 2012/0227274 A1* | 9/2012 | Watanabe | ................ | G01C 9/06 |
| | | | | 33/365 |
| 2012/0304769 A1* | 12/2012 | Watanabe | ........... | G01P 15/0802 |
| | | | | 73/514.01 |
| 2013/0104677 A1* | 5/2013 | Watanabe | ............... | G01P 15/09 |
| | | | | 73/865.8 |
| 2013/0112019 A1* | 5/2013 | Watanabe | ............. | G01P 15/097 |
| | | | | 73/865.8 |
| 2013/0167669 A1* | 7/2013 | Watanabe | ................ | B06B 1/06 |
| | | | | 73/865 |

FOREIGN PATENT DOCUMENTS

| | | | |
|---|---|---|---|
| JP | 2003-281682 | A | 10/2003 |
| JP | 2005-030786 | A | 2/2005 |
| JP | 4996498 | B2 | 8/2012 |
| JP | 2013-205164 | A | 10/2013 |
| JP | 2015-102329 | A | 6/2015 |

\* cited by examiner

MEASUREMENT INSTRUMENT, MEASUREMENT METHOD, MEASUREMENT SYSTEM, AND PROGRAM

CROSS-REFERENCE TO RELATED APPLICATIONS

This application is a divisional of U.S. patent application Ser. No. 15/272,862, filed on Sep. 22, 2016, which claims priority to Japanese Application Nos. 2015-196618 and 2015-196615, both filed on Oct. 2, 2015. The entire disclosures of Japanese Patent Application Nos. 2015-196618 and No. 2015-196615 are expressly incorporated by reference herein.

BACKGROUND

1. Technical Field

The present invention relates to a measurement instrument, a measurement method, a measurement system, and a program.

2. Related Art

JP-A-2005-30786 describes that, in measurement units of the weights of vehicles passing through bridges, the running speeds of passing vehicles are detected by installing multiple sensors for speed detection along running paths, the wheel axis locations and the number of wheel axes of passing vehicles are detected by installing sensors for wheel axis detection in running paths, passing vehicles are recognized using running speeds and wheel axis locations, the deformation amounts of bridges are measured multiple times within set measurement durations for the wheel axes of at least the passing vehicles that have been recognized by installing measurement units of deformation amounts in the bridges, and the weights of the passing vehicles are computed on the basis of vehicle recognition data and the measurement data of the deformation amounts for wheel axes.

In JP-A-2005-30786, the speeds or weights of vehicles running on bridges are measured and vehicles are recognized using sensors for speed detection, sensors for wheel axis detection, and distortion gauges. Therefore, in JP-A-2005-30786, a number of kinds of sensors are used, and thus there is a problem in that high costs are required and great efforts are taken for installation of sensors and the like.

SUMMARY

An advantage of some aspects of the invention is to analyze the motion of moving objects on structures using small-size and simple system constitutions and reduce costs or save efforts for installation of sensors.

A first aspect of the invention is directed to a measurement instrument including: an acquisition unit that acquires width-direction acceleration of a surface of a structure on which a moving object moves from an acceleration sensor provided in the structure on which the moving object moves; and an analysis unit that analyzes motion of the moving object moving on the structure on the basis of the width-direction acceleration. According to the first aspect, it is possible to analyze the motion of moving objects on structures using small-size and simple system constitutions and reduce costs or save efforts for installation of sensors.

The acceleration sensor may be provided in an end portion of the structure which is parallel to a regulation direction of a moving direction regulation unit for the moving object which is provided in the structure and in a central portion of the end portion in the regulation direction. In such a case, the acceleration sensor is capable of clearly detecting width-direction acceleration.

The acquisition unit may have a displacement computation unit that acquires vertical-direction acceleration of the surface of the structure on which the moving object moves and computes vertical-direction displacement of the structure on the basis of the vertical-direction acceleration, and the analysis unit may compute a passing duration of the moving object moving on the structure on the basis of the vertical-direction displacement. In such a case, the measurement instrument is capable of computing the passing duration of moving objects on structures using small-size and simple system constitutions and is capable of reducing costs or saving efforts for installation of sensors.

The analysis unit may compute a passing duration of the moving object on the basis of the wave amplitude of the vertical-direction displacement generated due to movement of the moving object on the structure. In such a case, the measurement instrument becomes capable of accurately computing the passing durations of moving objects.

The analysis unit may divide the wave amplitude into multiple sections and compute the passing duration of the moving object moving on the structure which corresponds to each of the sections. In such a case, the measurement instrument becomes capable of computing the passing durations of moving objects on structures in detail.

The acquisition unit may have a displacement computation unit which acquires the vertical-direction acceleration of the surface of the structure on which the moving object moves and computes the vertical-direction displacement of the structure on the basis of the vertical-direction acceleration, and the analysis unit may determine stoppage of the moving object on the structure on the basis of the width-direction acceleration and the vertical-direction displacement. In such a case, the measurement instrument is capable of determining the stoppage of moving objects on structures using small-size and simple system constitutions and is capable of reducing costs or saving efforts for installation of sensors.

The analysis unit may determine stoppage of the moving object on the structure on the basis of a wave amplitude of the width-direction acceleration generated due to movement of the moving object on the structure and a wave amplitude of the vertical-direction displacement generated due to movement of the moving object on the structure. In such a case, the measurement instrument becomes capable of accurately computing the stoppage of moving objects.

The analysis unit may determine stoppage of the moving object in a case in which the wave amplitude of the width-direction acceleration is larger by a predetermined value than the wave amplitude of the vertical-direction acceleration. In such a case, the measurement instrument becomes capable of accurately computing the stoppage of moving objects.

The analysis unit may compute a stoppage time of the moving object on the structure on the basis of a peak time of the vertical-direction displacement and a time at which the wave amplitude of the width-direction acceleration is terminated. In such a case, the measurement instrument is capable of computing the stoppage time of moving objects on structures using small-size and simple system constitutions and is capable of reducing costs or saving efforts for installation of sensors.

The analysis unit may determine path changes of the moving object on the structure on the basis of the width-direction acceleration. In such a case, the measurement instrument is capable of determining path changes of moving objects on structures using small-size and simple system constitutions and is capable of reducing costs or saving efforts for installation of sensors.

The analysis unit may determine path changes of the moving object on the basis of a degree and a sign of a crest value of the width-direction acceleration. In such a case, the measurement instrument becomes capable of accurately determining the path changes of moving objects.

The analysis unit may determine an entering direction of the moving object into the structure on the basis of the width-direction acceleration and an envelope curve of the width-direction acceleration. In such a case, the measurement instrument is capable of determining the entering direction of moving objects on structures using small-size and simple system constitutions and is capable of reducing costs or saving efforts for installation of sensors.

The analysis unit may determine the entering direction of the moving object on the basis of the appearance time of the envelope curve with respect to the width-direction acceleration. In such a case, the measurement instrument becomes capable of accurately determining the entering direction of moving objects.

The analysis unit may determine the entering direction of the moving object on the basis of whether the envelope curve appears even before the width-direction acceleration appears or the envelope curve appears even after the width-direction acceleration does not appear any longer. In such a case, the measurement instrument is capable of accurately determining the entering directions of moving objects.

A filter unit that suppresses acceleration components which are included in the width-direction acceleration that is computed by the envelope curve and is generated due to movement of the moving object on the structure may be further provided. In such a case, the measurement instrument is capable of accurately determining the entering directions of moving objects.

An acceleration waveform acquisition unit that acquires and stores characteristic information of a waveform of the width-direction acceleration may be further provided. In such a case, the measurement instrument is capable of reducing the storage capacities of storage devices.

The analysis unit may have a displacement computation unit that acquires vertical-direction acceleration of a surface of the structure on which the moving object moves and computes vertical-direction displacement of the structure on the basis of the vertical-direction acceleration and a displacement waveform acquisition unit that acquires and stores characteristic information of a waveform of the vertical-direction displacement. In such a case, the measurement instrument is capable of reducing the storage capacities of storage devices.

An output unit that outputs analysis results of motion of the moving object may be further provided. In such a case, users are able to learn the analysis results of the motion of moving objects.

A filter unit that suppresses intrinsic resonance frequency components which are included in the width-direction acceleration and which the structure has may be further provided. In such a case, the measurement instrument is capable of accurately analyzing the motion of moving objects on structures.

The structure may be a bridge. In such a case, the measurement instrument is capable of analyzing motion of moving objects on bridges using small-size and simple system constitutions and is capable of reducing costs or saving efforts for installation of sensors.

The width-direction acceleration may be a component of an acceleration of gravity due to a slope of the structure. In such a case, the measurement instrument is capable of accurately analyzing the motion of moving objects on structures.

The analysis unit may compute a passing duration of the moving object moving on the structure on the basis of the width-direction acceleration. In such a case, the measurement instrument becomes capable of accurately computing the passing durations of moving objects.

A second aspect of the invention is directed to a measurement method including: acquiring width-direction acceleration from an acceleration sensor provided in a structure on which a moving object moves; and analyzing motion of the moving object moving on the structure on the basis of the width-direction acceleration. According to the second aspect, it is possible to analyze the motion of moving objects on structures using small-size and simple system constitutions and reduce costs or save efforts for installation of sensors.

A third aspect of the invention is directed to a measurement system including: an acceleration sensor provided in a structure on which a moving object moves; an acquisition unit that acquires width-direction acceleration that is output from the acceleration sensor; and an analysis unit that analyzes motion of the moving object moving on the structure on the basis of the width-direction acceleration. According to the third aspect, it is possible to analyze the motion of moving objects on structures using small-size and simple system constitutions and reduce costs or save efforts for installation of sensors.

A fourth aspect of the invention is directed to a program commanding a measurement instrument to execute a sequence, the sequence including acquiring width-direction acceleration from an acceleration sensor provided in a structure on which a moving object moves; and analyzing motion of the moving object moving on the structure on the basis of the width-direction acceleration. According to the fourth aspect, it is possible to analyze the motion of moving objects on structures using small-size and simple system constitutions and reduce costs or save efforts for installation of sensors.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described with reference to the accompanying drawings.

First Embodiment

Figure 1:
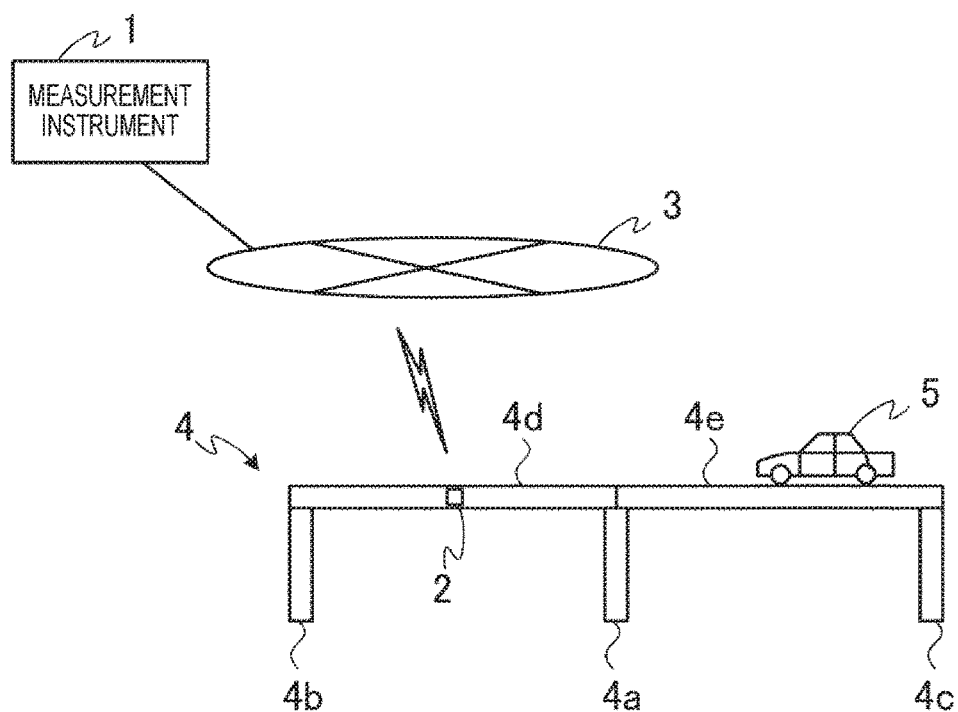
FIG. 1 is a view illustrating a constitutional example of a measurement system according to a first embodiment.

FIG. 1 is a view illustrating a constitutional example of a measurement system according to a first embodiment. As illustrated in FIG. 1, the measurement system has a measurement instrument 1 and an acceleration sensor 2. In addition, FIG. 1 illustrates a bridge 4.

The bridge 4 has a bridge pier 4a located in the central portion (including substantial central portions) of the bridge 4, two bridge abutments 4b and 4c located at both ends, a floor slab 4d extending from the bridge abutment 4b to the bridge pier 4a, and a floor slab 4e extending from the bridge abutment 4c to the bridge pier 4a. The bridge pier 4a and the bridge abutments 4b and 4c are respectively fixed onto basements (not illustrated) constructed on the ground.

The acceleration sensor 2 is preferably provided on the floor slab 4d of the bridge 4 in a case in which the subject structure is the bridge 4. Here, the floor slab 4d refers to a portion constituting a surface on which moving objects move. The acceleration sensor 2 is installed, for example, on a side surface of the floor slab 4d. The acceleration sensor 2 measures acceleration generated by the deformation of the floor slab 4d which is caused by a vehicle 5 (corresponding to a moving object according to the invention) passing through the bridge and outputs acceleration data thereof. The measurement instrument 1 and the acceleration sensor 2 are connected to each other through a communication network 3 so as to be capable of communicating with each other, and the acceleration sensor 2 sends the measured acceleration data to the measurement instrument 1 through the communication network 3. The acceleration sensor 2 includes an inertia sensor that outputs acceleration and angular speeds. Hereinafter, in some cases, acceleration data that are output from the acceleration sensor 2 will be expressed simply as acceleration.

The acceleration sensor 2 has, for example, a wireless communication interface or is connected to a wireless communication interface so as to be connected to the communication network 3 through the wireless communication interface.

The measurement instrument 1 receives the acceleration sent from the acceleration sensor 2. The measurement instrument 1 detects the passing of the vehicle 5 on the floor slab 4d on the basis of the acceleration sent from the acceleration sensor 2. That is, the measurement instrument 1 detects whether or not the vehicle 5 passes through on the floor slab 4d. Hereinafter, the passing of the vehicle 5 on the floor slab 4d will be referred to as an "event".

When an event is detected, the measurement instrument 1 analyzes the motion of the vehicle 5 that has passed through the floor slab 4d. For example, the measurement instrument 1 analyzes the passing duration, stoppage on the floor slab 4d, path changes, entering direction, and the like of the vehicle 5 that has passed through the floor slab 4d.

As described above, the measurement instrument 1 detects events on the basis of acceleration obtained from the acceleration sensor 2 and analyzes the motion of the vehicle 5. Therefore, the measurement instrument 1 does not need to use a variety of sensors in order to analyze the motion of the vehicle 5 and is capable of reducing costs. In addition, the measurement instrument 1 is capable of analyzing the motion of the vehicle 5 using at least one acceleration sensor 2 and saves efforts for the installation of sensors on the floor slab 4d.

Figure 2:
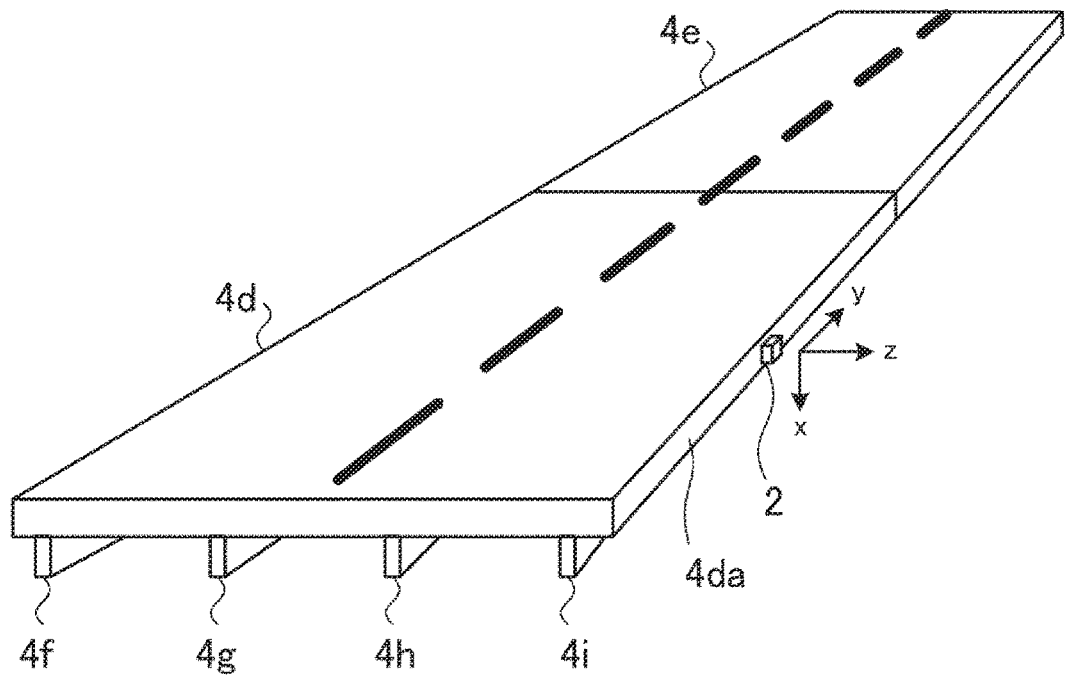
FIG. 2 is a view illustrating an example of an installation method of an acceleration sensor.

FIG. 2 is a view illustrating an example of an installation method of the acceleration sensor 2. FIG. 2 illustrates a perspective view of the floor slabs 4d and 4e illustrated in FIG. 1.

FIG. 2 illustrates main beams 4f to 4i which are not illustrated in FIG. 1. The main beams 4f to 4i are overlaid on the upper portions of the bridge pier 4a and the bridge abutments 4b and 4c, and the floor slabs 4d and 4e are installed on the upper portions of the main beams 4f to 4i. Hereinafter, in order to facilitate the understanding of description, the road surface of the floor slab 4d is considered to be horizontal, and the vertical direction of the road surface coincides with the perpendicular direction.

The acceleration sensor 2 is provided in the central portion of a side (end portion) that is substantially parallel to the regulation direction of a moving direction regulation unit for the moving object which is provided in the structure having a substantially quadrilateral shape when seen in a plan view. For example, the acceleration sensor 2 is mounted in the central portion (including substantial central portions) in the regulation direction of a side surface 4da (corresponding to the end portion according to the invention) that is parallel to (or substantially parallel to) the regulation direction of the moving direction regulation unit (for example, traffic lanes, curbstones, parapets, and the like) for the vehicle 5 which is provided on the floor slab 4d. The acceleration sensor 2 is capable of measuring acceleration generated in each of three-axis directions that intersect with each other. The acceleration sensor 2 is installed on the side surface 4da of the floor slab 4d by aligning, among three detection axes (an x axis, a y axis, and a z axis), one axis (for example, the x axis) to the vertical direction of the road surface of the floor slab 4d and aligning another axis (for example, the z axis) to the width direction of the road surface of the floor slab 4d. The acceleration sensor 2 detects acceleration along the three axes at, for example, set sampling frequencies and sends the detected acceleration data to the measurement instrument 1 through the communication network 3.

Figure 3:
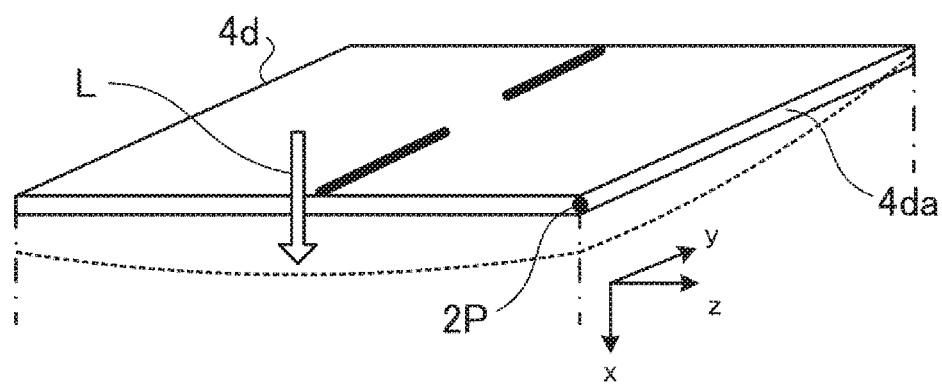
FIG. 3 is a view illustrating an example of a fashion of deformation of a floor slab.

FIG. 3 is a view illustrating an example of a fashion of the deformation of the floor slab 4d. FIG. 3 illustrates a perspective view of the floor slab 4d of FIG. 2 cut at the portion of the acceleration sensor 2.

As illustrated in FIG. 3, in a case in which the vehicle 5 passes through on the floor slab, the floor slab 4d deforms to bend downwards due to the load L of the vehicle 5. A mounting location 2P of the acceleration sensor 2 is a location farthest from the bridge pier 4a and the bridge abutment 4b, and thus the location of the floor slab 4d in the vertical direction (the location along the x axis) is likely to change more significantly than other locations. In addition, the mounting location 2P of the acceleration sensor 2 is on the side surface 4da of the floor slab 4d, and thus the slope of the floor slab 4d with respect to the horizontal direction (the slop of the z axis) is likely to be more significant than that in other locations. Therefore, when the acceleration sensor is mounted at the mounting location 2P of the floor slab 4d, the acceleration sensor 2 is capable of clearly detecting acceleration in the vertical direction or acceleration in the width direction of the floor slab 4d which is generated by the passing of the vehicle 5.

Figure 4:
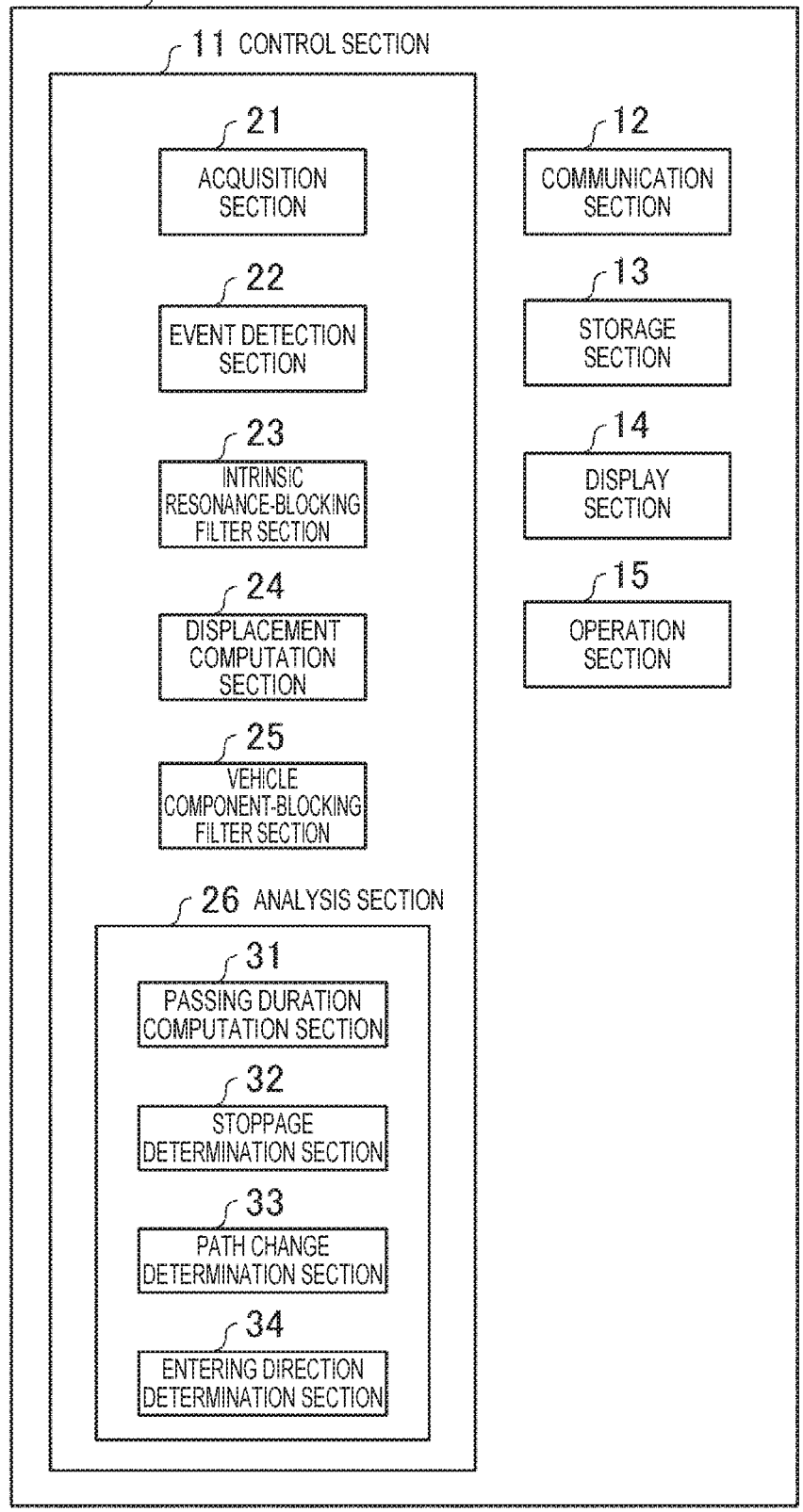
FIG. 4 is a view illustrating a constitutional example of functional blocks of a measurement instrument.

FIG. 4 is a view illustrating a constitutional example of the functional blocks of the measurement instrument 1. As illustrated in FIG. 4, the measurement instrument 1 has a control unit 11, a communication unit 12, a storage unit 13, a display unit (corresponding to an output unit according to the invention) 14, and an operation unit 15.

Although described below in detail, the control unit 11 detects events. When detecting an event, the control unit 11 analyzes the motion of the vehicle 5 that has passed through on the floor slab 4d.

The communication unit 12 receives acceleration from the acceleration sensor 2 through the communication network 3. The communication unit 12 outputs the acceleration received from the acceleration sensor 2 to the control unit 11.

The storage unit 13 stores programs, data, and the like necessary for the control unit 11 to execute computation processes or control processes. In addition, the storage unit 13 stores programs, data, and the like necessary for the control unit 11 to realize predetermined application functions. A variety of programs, data, and the like may be stored in non-volatile storage media in advance or may be received by the control unit 11 from servers through the communication network 3 and stored in the storage unit 13. The storage unit 13 is constituted of, for example, a variety of integrated circuit (IC) memories such as read only memory (ROM), flash ROM, and random access memory (RAM), recording media such as hard discs and memory cards, or the like.

The display unit 14 outputs control results and the like of the control unit 11 to a display device.

The operation unit 15 acquires operation data from users and executes processes of sending the operation data to the control unit 11.

The control unit 11 has an acquisition unit 21, an event detection unit 22, an intrinsic resonance-blocking filter unit 23, a displacement computation unit 24, a vehicle component-blocking filter unit 25, and an analysis unit 26. The respective units in the control unit 11 have functions that are realized using, for example, central processing units (CPU) that execute programs stored in the storage unit 13. The respective units in the control unit may have functions that are realized using custom integrated circuits (IC) such as application specific integrated circuits (ASIC) or may have functions that are realized using CPU and ASIC.

The acquisition unit 21 acquires the acceleration of the acceleration sensor 2 which has been sent using the communication unit 12. The acceleration acquired using the acquisition unit 21 includes at least vertical-direction acceleration (x-axis direction acceleration) and width-direction acceleration (z-axis direction acceleration). The vertical-direction acceleration and the width-direction acceleration are output to the respective units in the control unit 11, and predetermined processes are executed.

Figure 5:
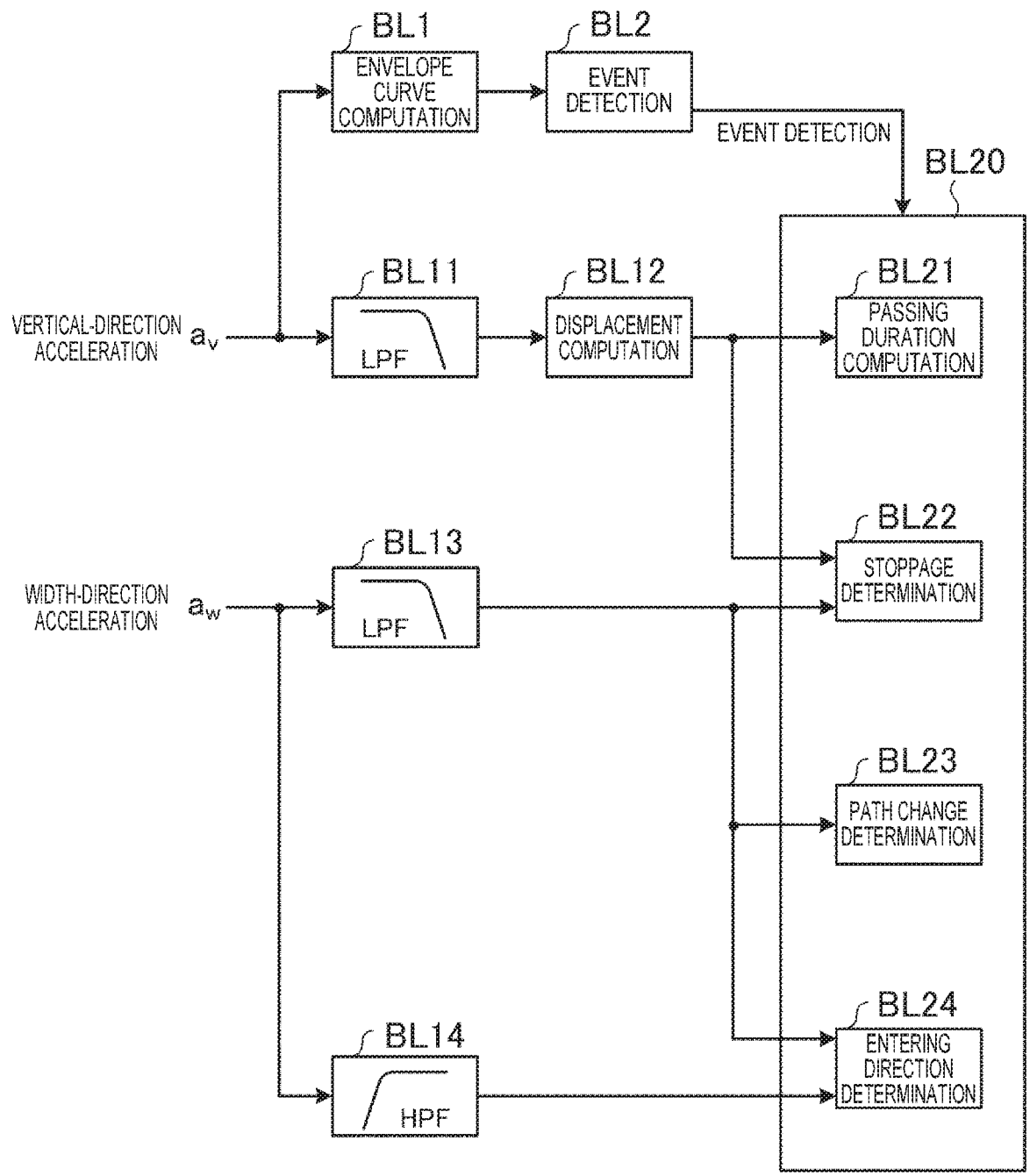
FIG. 5 is a view illustrating relationships between vertical-direction acceleration and width-direction acceleration which are acquired using an acquisition unit and processes executed on the basis of the acceleration.

FIG. 5 is a view illustrating relationships between the vertical-direction acceleration and the width-direction acceleration which have been acquired using the acquisition unit 21 and processes executed on the basis of the acceleration. As indicated by the block BL1 in FIG. 5, for the vertical-direction acceleration $a_v$ acquired using the acquisition unit 21, an envelope curve is computed. The envelope curve of the vertical-direction acceleration $a_v$ is used to detect events as indicated by the block BL2. The envelope curve computation indicated by the block BL1 and the event detection indicated by the block BL2 are executed using the event detection unit 22 described below.

As indicated by the block BL11, for the vertical-direction acceleration $a_v$ acquired using the acquisition unit 21, high-frequency components are suppressed. The vertical-direction acceleration $a_v$ for which high-frequency components are suppressed is used to compute displacement (the displacement of the floor slab 4d in the vertical direction) as indicated by the block BL12. Vertical-direction displacement is computed by, for example, integrating the vertical-direction acceleration $a_v$ twice. The suppression of high-frequency components of the vertical-direction acceleration $a_v$ indicated by the block BL11 is executed using the intrinsic resonance-blocking filter unit 23 described below, and the displacement computation indicated by the block BL12 is executed using the displacement computation unit 24 described below.

As indicated by the block BL13, for the width-direction acceleration $a_w$ acquired using the acquisition unit 21, high-frequency components are suppressed. The suppression of high-frequency components of the width-direction acceleration $a_w$ indicated by the block BL13 is executed using the intrinsic resonance-blocking filter unit 23 described below.

As indicated by the block BL14, for the width-direction acceleration $a_w$ acquired using the acquisition unit 21, low-frequency components are suppressed. The suppression of low-frequency components of the width-direction acceleration $a_w$ indicated by the block BL14 is executed using the vehicle component-blocking filter unit 25 described below.

As indicated by the block BL20, the vertical-direction displacement (BL12) computed from the vertical-direction acceleration $a_v$ for which high-frequency components are suppressed, the width-direction acceleration $a_w$ for which high-frequency components are suppressed (BL13), and the width-direction acceleration $a_w$ for which low-frequency components are suppressed (BL14) are used to analyze the motion of the vehicle 5. The motion analysis of the vehicle 5 is executed when an event is detected in the block BL2.

The motion analysis of the vehicle 5 includes computation of a passing duration taken for the vehicle 5 to enter and leave the floor slab 4d, determination of stoppage of the vehicle 5 on the floor slab 4d, determination of path changes of the vehicle 5 on the floor slab 4d, and determination of the entering direction of the vehicle 5 into the floor slab 4d. The motion analysis of the vehicle 5 indicated by the block BL20 is executed using the analysis unit 26 described below.

As indicated by the block BL21, the vertical-direction displacement of the floor slab 4d which has been computed in the block BL12 is used to compute the passing duration of the vehicle 5 on the floor slab 4d. The passing duration computation indicated by the block BL21 is executed using the passing duration computation unit 31 described below.

As indicated by the block BL22, the vertical-direction displacement of the floor slab 4d which has been computed in the block BL12 and the width-direction acceleration $a_w$ for which high-frequency components have been suppressed in the block BL13 are used to determine stoppage of the vehicle 5. The stoppage determination of the vehicle 5 indicated by the block BL22 is executed using the stoppage determination unit 32 described below.

As indicated by the block BL23, the width-direction acceleration $a_w$ for which high-frequency components have been suppressed in the block BL13 is used to determine the path change of the vehicle 5. The path change determination of the vehicle 5 indicated by the block BL23 is executed using the path change determination unit 33 described below.

As indicated by the block BL24, the width-direction acceleration $a_w$ for which high-frequency components have been suppressed in the block BL13 and the width-direction acceleration $a_w$ for which low-frequency components have been suppressed in the block BL14 are used to determine the entering direction of the vehicle 5. The entering direction determination of the vehicle 5 indicated by the block BL24 is executed using the entering direction determination unit 34 described below.

Description will continue with reference to FIG. 4. The vertical-direction acceleration acquired using the acquisition unit 21 is input to the event detection unit 22 (refer to the block BL1 in FIG. 5). The event detection unit 22 computes the absolute value of the input vertical-direction acceleration and computes the envelope curve (signal) of the computed absolute value.

Figure 6:
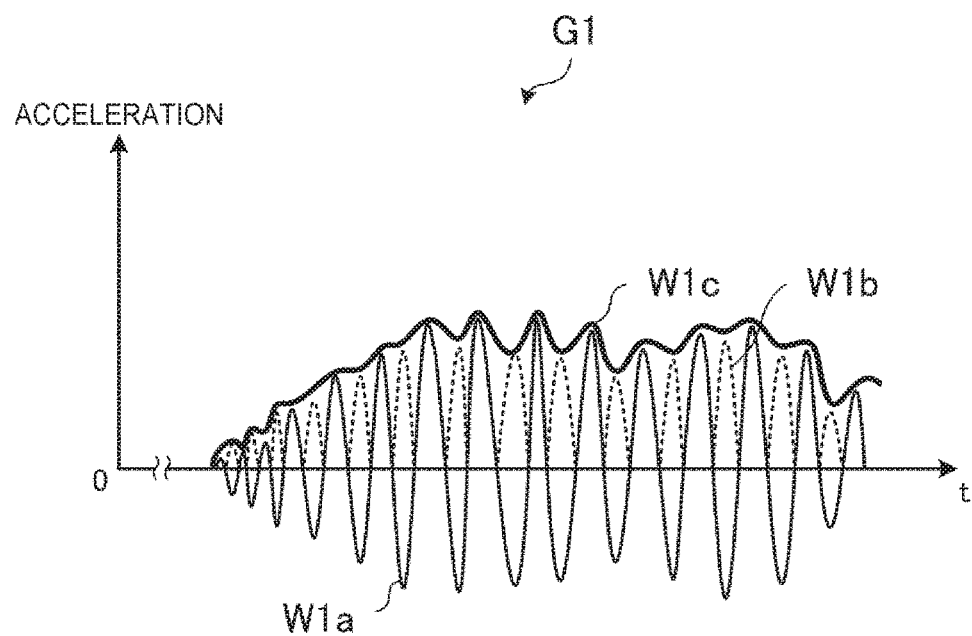
FIG. 6 is a view illustrating an example of an envelope curve.

FIG. 6 is a view illustrating an example of an envelope curve. For a graph G1 illustrated in FIG. 6, the horizontal axis indicates time, and the vertical axis indicates acceleration.

A waveform W1a illustrated in the graph G1 indicates the vertical-direction acceleration from which an offset input to the event detection unit 22 has been removed. A waveform W1b indicated by a dashed line indicates the vertical-direction acceleration of which the absolute value has been computed using the event detection unit 22. That is, the waveform W1b is a waveform obtained by inverting negative portions in the waveform W1a to be positive. A waveform W1c indicates an envelope curve computed using the event detection unit 22.

The vertical-direction acceleration acquired using the acquisition unit 21 is input to the event detection unit 22 without passing through the intrinsic resonance-blocking filter unit 23 and the vehicle component-blocking filter unit 25, and the event detection unit 22 computes the envelope curve of the vertical-direction acceleration.

The event detection unit 22 determines whether or not the amplitude of the computed envelope curve exceeds a predetermined threshold value. The event detection unit 22 detects an event in a case in which the amplitude of the computed envelope curve exceeds a predetermined threshold value (refer to the block BL2 in FIG. 5).

Description will continue with reference to FIG. 4. The vertical-direction acceleration and the width-direction acceleration which have been acquired using the acquisition unit 21 are input to the intrinsic resonance-blocking filter unit 23 (refer to the blocks BL11 and BL13 in FIG. 5). The intrinsic resonance-blocking filter unit 23 suppresses the intrinsic resonance frequency of the floor slab 4d which is included in the vertical-direction acceleration and the width-direction acceleration which have been input.

Figure 7:
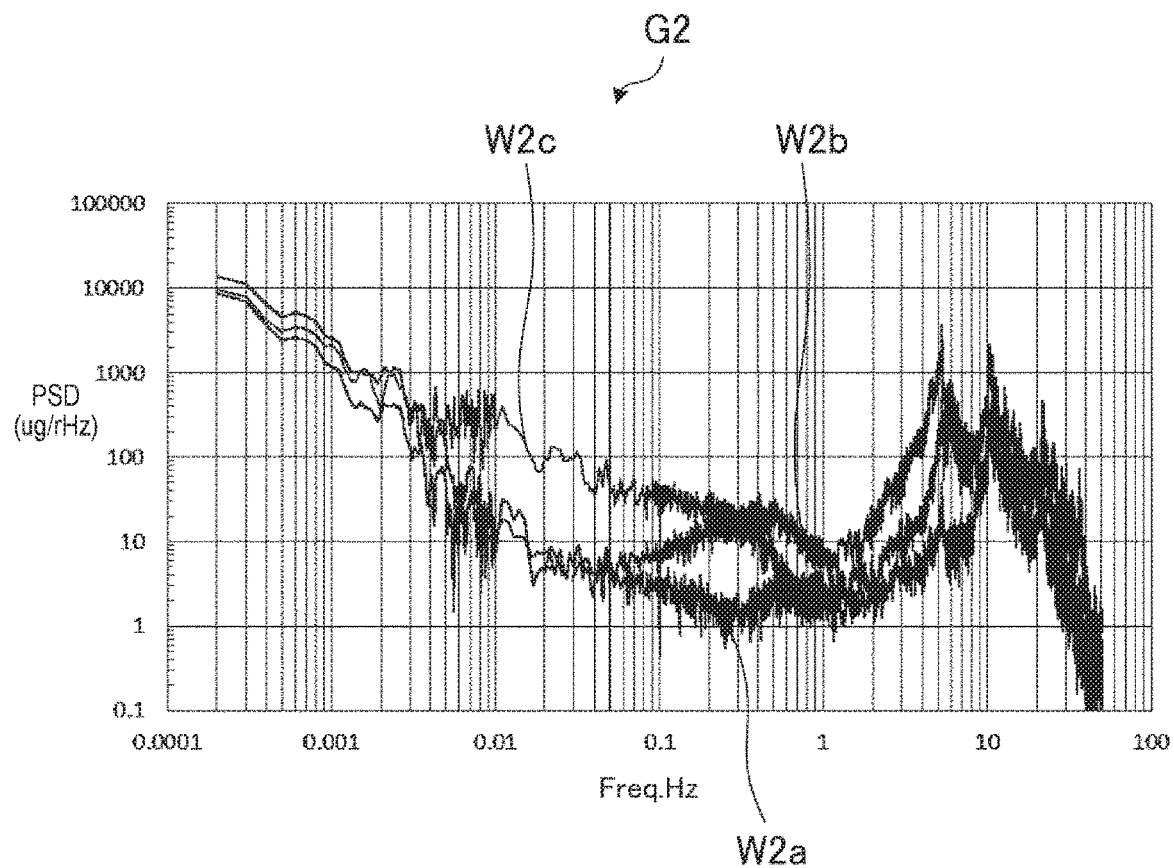
FIG. 7 is a view illustrating an example of frequency characteristics of acceleration when a vehicle passes through a floor slab.

FIG. 7 is a view illustrating an example of the frequency characteristics of acceleration when the vehicle passes through the floor slab 4d. For a graph G2 illustrated in FIG. 7, the horizontal axis indicates frequency, and the vertical axis indicates power spectrum density. The length of the floor slab 4d at which the frequency characteristics of acceleration are measured is "30 m".

A waveform W2a illustrated in the graph G2 indicates the frequency characteristics of the acceleration in the x-axis direction (refer to FIG. 2) of the acceleration sensor 2 mounted on the side surface 4da of the floor slab 4d. A waveform W2b indicates the frequency characteristics of the acceleration in the y-axis direction of the acceleration sensor 2. A waveform W2c indicates the frequency characteristics of the acceleration in the z-axis direction of the acceleration sensor 2.

As illustrated in the graph G2, the acceleration in the respective axes has peaks in a range of approximately "5 Hz to 30 Hz". Several peaks near at "10 Hz" are considered to result from the intrinsic resonance of the floor slab 4d.

The acceleration illustrated in the graph G2 in a range of "0.1 Hz to 1 Hz" is regarded as acceleration generated by the deformation of the floor slab 4d which is caused by the passing of the vehicle 5 at a speed in a range of "3 m/s to 17 m/s" which are assumed as speeds necessary for the vehicle 5 to pass through the floor slab 4d. This is because, for example, when the speed of the vehicle 5 passing through the floor slab 4d is set in a range of "3 m/s to 17 m/s", the vibration cycle (a duration in which the floor slab bends downwards and then returns to the original location) generated by the deformation of the floor slab 4d which is caused by the passing of the vehicle 5 is considered to reach "10 s to 1.8 s" (0.1 Hz to 0.6 Hz) which is approximately equal to the passing duration of the vehicle 5.

Frequency components that are lower than "0.1 Hz" are considered to result from the long-term cyclic changes of the floor slab 4d due to the environment such as temperature and wind, the normal micro-motion (environmental vibrations) of land surfaces, the 1/f fluctuation noise of sensors, and the like.

According to what has been described above, the frequency characteristics of the acceleration of the floor slab 4d are generally classified into a high pass part including the intrinsic resonance frequency of the floor slab 4d and a low pass part including the frequencies of acceleration generated by the passing of the vehicle 5. For example, the frequency characteristics of the acceleration illustrated in the graph G2 include the intrinsic resonance frequency of the floor slab 4d at frequencies higher than at least "1 Hz" and include the frequency components of acceleration generated by the passing of the vehicle 5 which is caused by the deformation of the floor slab 4d at frequencies of "1 Hz" or lower.

The intrinsic resonance frequency of the floor slab 4d varies depending on the structure, material, and the like of the bridge 4. In addition, the frequency components of acceleration generated by the deformation of the floor slab 4d which is caused by the passing of the vehicle 5 vary depending on the length of the floor slab 4d and the imaginary speed of the vehicle 5 passing through the floor slab 4d.

As described below, the analysis unit 26 analyzes the motion of the vehicle 5 on the floor slab 4d. Therefore, the intrinsic resonance frequency components of the floor slab 4d which are included in the vertical-direction acceleration and the width-direction acceleration are information not necessary to analyze the motion of the vehicle 5 (although described below, in the determination of the entering direction, the intrinsic resonance frequency components are also used (BL14 in FIG. 5)). Therefore, the intrinsic resonance-blocking filter unit 23 suppresses the intrinsic resonance frequency components of the floor slab 4d which are included in the vertical-direction acceleration and the width-direction acceleration.

As described above, the frequency characteristics of the acceleration of the floor slab 4d are generally classified into a high pass part including the intrinsic resonance frequency of the floor slab 4d and a low pass part including the frequencies of acceleration generated by the passing of the vehicle 5. Therefore, the intrinsic resonance-blocking filter unit 23 is constituted of, for example, a low pass filter (LPF). The cut-off frequency of LPF is set to be higher than the acceleration frequency generated by the deformation of the floor slab 4d which is caused by the passing of the vehicle 5 and is set to be lower than the intrinsic resonance frequency of the floor slab 4d. For example, in the case of the example of the frequency characteristics illustrated in the graph G2 of FIG. 7, the cut-off frequency is set to "1 Hz". In such a case, for vertical-direction acceleration and width-direction acceleration which pass through the intrinsic resonance-blocking filter unit 23, the intrinsic resonance frequency components of the floor slab 4d are blocked, and the frequency components of acceleration generated by the deformation of the floor slab 4d which is caused by the passing of the vehicle 5 pass through.

The intrinsic resonance-blocking filter unit 23 is desirably constituted of a Bessel filter so as to prevent information that waveforms of acceleration have from being lost.

In addition, as described above, the intrinsic resonance frequency of the floor slab 4d varies depending on the kind or structure of the bridge 4 and, in some cases, appears at near the frequency of acceleration generated by the deformation of the floor slab 4d which is caused by the passing of the vehicle 5. For example, in the graph G2 of FIG. 7, there are cases in which the intrinsic resonance frequency appears at near 3 Hz. In this case, the cut-off frequency of the filter is decreased or the filter order is increased so that the intrinsic resonance frequency is sufficiently suppressed.

Description will continue with reference to FIG. 4. The vertical-direction acceleration for which the intrinsic resonance frequency components of the floor slab 4d are suppressed is input to the displacement computation unit 24 using the intrinsic resonance-blocking filter unit (refer to the block BL12 in FIG. 5). The displacement computation unit 24 computes the vertical-direction displacement (x-axis direction displacement) of the floor slab 4d from the input vertical-direction acceleration. For example, the displacement computation unit 24 computes the vertical-direction displacement of the floor slab 4d by integrating the vertical-direction acceleration twice.

The width-direction acceleration acquired using the acquisition unit 21 is input to the vehicle component-blocking filter unit 25 (refer to the block BL14 in FIG. 5). The vehicle component-blocking filter unit 25 suppresses the acceleration components of the floor slab 4d generated by the passing of the vehicle 5 which are included in the input width-direction acceleration.

As described above, the frequency characteristics of the acceleration of the floor slab 4d are generally classified into a high pass part including the intrinsic resonance frequency of the floor slab 4d and a low pass part including the deformation components of the floor slab generated by the passing of the vehicle 5. Therefore, the vehicle component-blocking filter unit 25 is constituted of, for example, a high pass filter (HPF). The cut-off frequency of HPF is set to be higher than the acceleration frequency generated by the deformation of the floor slab 4d which is caused by the passing of the vehicle 5 and is set to be lower than the intrinsic resonance frequency of the floor slab 4d. For example, in the case of the example of the frequency characteristics illustrated in the graph G2 of FIG. 7, the cut-off frequency is set to "1 Hz". In such a case, for width-direction acceleration which passes through the vehicle component-blocking filter unit 25, the frequency components of acceleration generated by the deformation of the floor slab 4d which is caused by the passing of the vehicle 5 are blocked, and the intrinsic resonance frequency components of the floor slab 4d pass through.

The vehicle component-blocking filter unit 25 is desirably constituted of a Bessel filter so as to prevent information that waveforms of width-direction acceleration have from being lost.

In addition, as described above, the intrinsic resonance frequency of the floor slab 4d varies depending on the kind or structure of the bridge 4 and, in some cases, appears at near the frequency of acceleration generated by the deformation of the floor slab 4d which is caused by the passing of the vehicle 5. For example, in the graph G2 of FIG. 7, there are cases in which the intrinsic resonance frequency appears in a range of 1 to 10 Hz. In this case, the cut-off frequency of the filter is decreased or the filter order is increased so that acceleration frequency components generated by the deformation of the floor slab 4d which is caused by the passing of the vehicle 5 are sufficiently suppressed.

When the event detection unit 22 detects an event, the analysis unit 26 analyzes the motion of the vehicle 5 moving on the floor slab 4d on the basis of at least one of the vertical-direction displacement which is computed from the vertical-direction acceleration and the width-direction acceleration (refer to the block BL20 in FIG. 5). As illustrated in FIG. 4, the analysis unit 26 has a passing duration computation unit 31, the stoppage determination unit 32, the path change determination unit 33, and an entering direction determination unit 34.

Before the description of the respective units in the analysis unit 26, the width-direction acceleration and the vertical-direction displacement of the floor slab 4d which are generated by the passing of the vehicle 5 will be described.

Figure 8:
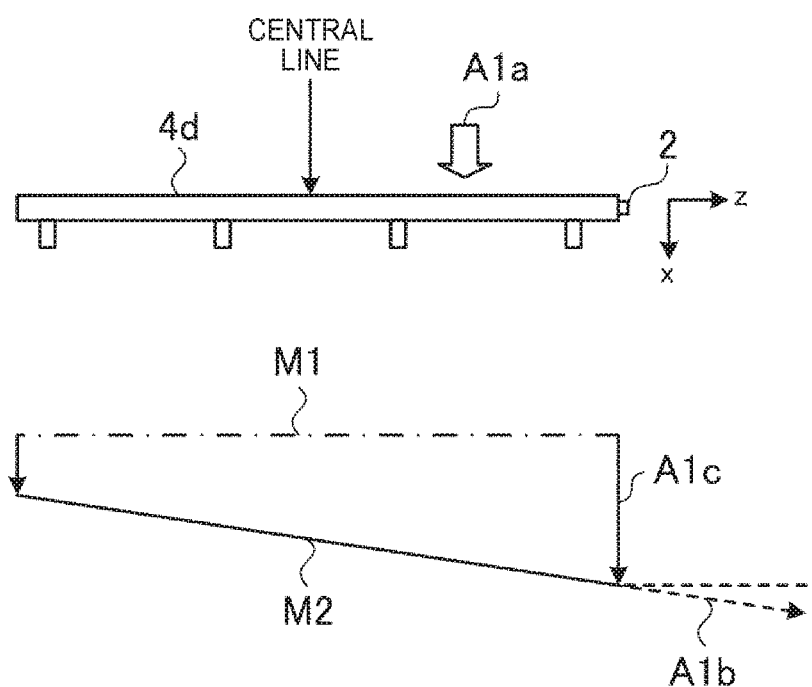
FIG. 8 is a first view illustrating the width-direction acceleration and the vertical-direction displacement of a floor slab which are generated by the passing of a vehicle.

FIG. 8 is a first view illustrating the width-direction acceleration and the vertical-direction displacement of the floor slab 4d which are generated by the passing of the vehicle 5.

FIG. 8 illustrates a section of the floor slab 4d and the main beams 4f to 4i illustrated in FIG. 2. In addition, FIG. 8 illustrates the acceleration sensor 2 mounted on the floor slab 4d.

A model M1 of a dot-dashed line illustrated in FIG. 8 indicates the location of the floor slab 4d when the vehicle 5 does not pass through on the floor slab 4d. A model M2 of a solid line indicates the location of the floor slab 4d when the vehicle 5 passes through a traffic lane indicated by an arrow A1a on the floor slab 4d (for example, the vehicle runs toward you from behind the paper).

When the vehicle 5 runs along the traffic lane indicated by the arrow A1a on the floor slab 4d, the floor slab 4d is inclined due to the load of the vehicle 5 so that the right-side end in the drawing is placed to be vertically lower than the left-side end as indicated by the model M2. Therefore, the z axis of the acceleration sensor 2 mounted on the floor slab 4d is inclined downwards from the horizontal direction as indicated by a dashed arrow A1b. The width-direction acceleration is a component of the acceleration of gravity due to the slope of the floor slab 4d in the width direction.

Figure 9:
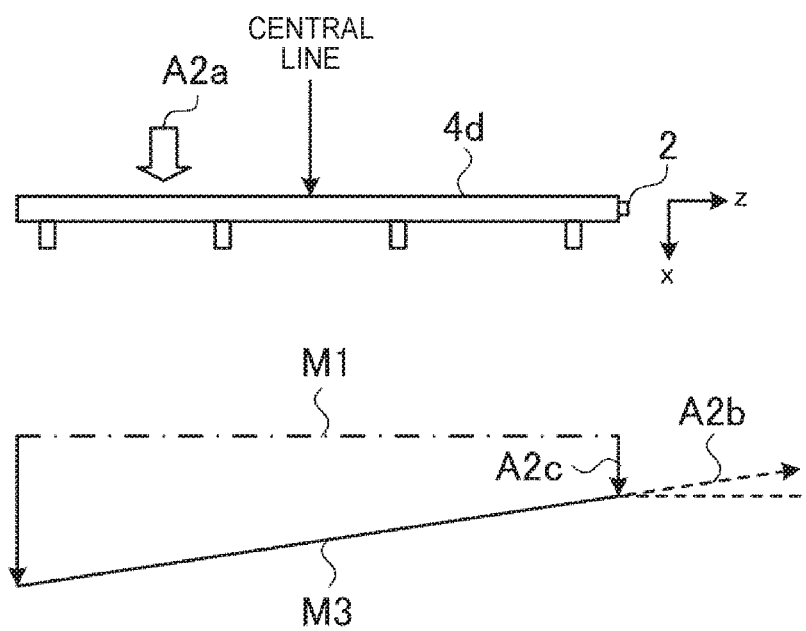
FIG. 9 is a second view illustrating the width-direction acceleration and the vertical-direction displacement of a floor slab which are generated by the passing of a vehicle.

FIG. 9 is a second view illustrating the width-direction acceleration and the vertical-direction displacement of the floor slab 4d which are generated by the passing of the vehicle 5. In FIG. 9, the same components as in FIG. 8 are given the same reference sign. A model M3 of a solid line illustrated in FIG. 9 indicates the location of the floor slab 4d when the vehicle 5 passes through a traffic lane indicated by an arrow A2a on the floor slab 4d (for example, the vehicle runs toward behind the paper from you).

When the vehicle 5 runs along the traffic lane indicated by the arrow A2a on the floor slab 4d, the floor slab 4d is inclined due to the load of the vehicle 5 so that the left-side end is placed to be vertically lower than the right-side end as indicated by the model M3. Therefore, the z axis of the acceleration sensor 2 mounted on the floor slab 4d is inclined upwards from the horizontal direction as indicated by a dashed arrow A2b.

The z axis of the acceleration sensor 2 is oriented downwards or upwards with respect to the horizontal direction depending on the location of the vehicle 5 running on the floor slab 4d as indicated by the dashed arrow A1b in FIG. 8 and the dashed arrow A2b in FIG. 9. That is, the width-direction acceleration that is output from the acceleration sensor 2 has a sign which changes depending on the location (running traffic lane) of the vehicle 5 running on the floor slab 4d. For example, in a case in which the vehicle 5 runs along the traffic lane indicated by the arrow A1a in FIG. 8, the sign of the width-direction acceleration that is output from the acceleration sensor 2 becomes negative. On the other hand, in a case in which the vehicle 5 runs along the traffic lane indicated by the arrow A2a in FIG. 9, the sign of the width-direction acceleration that is output from the acceleration sensor 2 becomes positive.

In addition, for the z axis of the acceleration sensor 2, the angle of the slope with respect to the horizontal direction changes due to the vehicle weight of the vehicle 5 passing through on the floor slab 4d. For example, in FIG. 8, as the vehicle weight of the vehicle 5 running along the traffic lane indicated by the arrow A1a increases, the angle of the dashed arrow A1b inclined downwards with respect to the horizontal direction increases. In addition, in FIG. 9, as the vehicle weight of the vehicle 5 running along the traffic lane indicated by the arrow A2a increases, the angle of the dashed arrow A1b inclined upwards with respect to the horizontal direction increases.

When the vehicle 5 passes through on the floor slab 4d, the vertical-direction displacement of the floor slab 4d has any one of a positive sign and a negative sign. For example, when the vehicle 5 passes through on the floor slab 4d, the floor slab 4d bends downward as indicated by an arrow A1c in FIG. 8 and an arrow A2c in FIG. 9 regardless of the running traffic lane of the vehicle 5. Therefore, for example, when a vertically upward orientation is regarded as positive, the vertical-direction displacement has a negative value.

In addition, the degree of the vertical-direction displacement is proportional to the vehicle weight of the vehicle 5. For example, as the vehicle weight of the vehicle increases, the floor slab 4d bends downwards more significantly, and the vertical-direction displacement increases.

The respective units in the analysis unit 26 will be described. First, the passing duration computation unit 31 will be described. The vertical-direction displacement of the floor slab 4d which has been computed using the displacement computation unit 24 is input to the passing duration computation unit 31 (refer to the block BL21 in FIG. 5). The passing duration computation unit 31 computes the passing duration of the vehicle 5 passing through the floor slab 4d on the basis of the input vertical-direction displacement.

Figure 10:
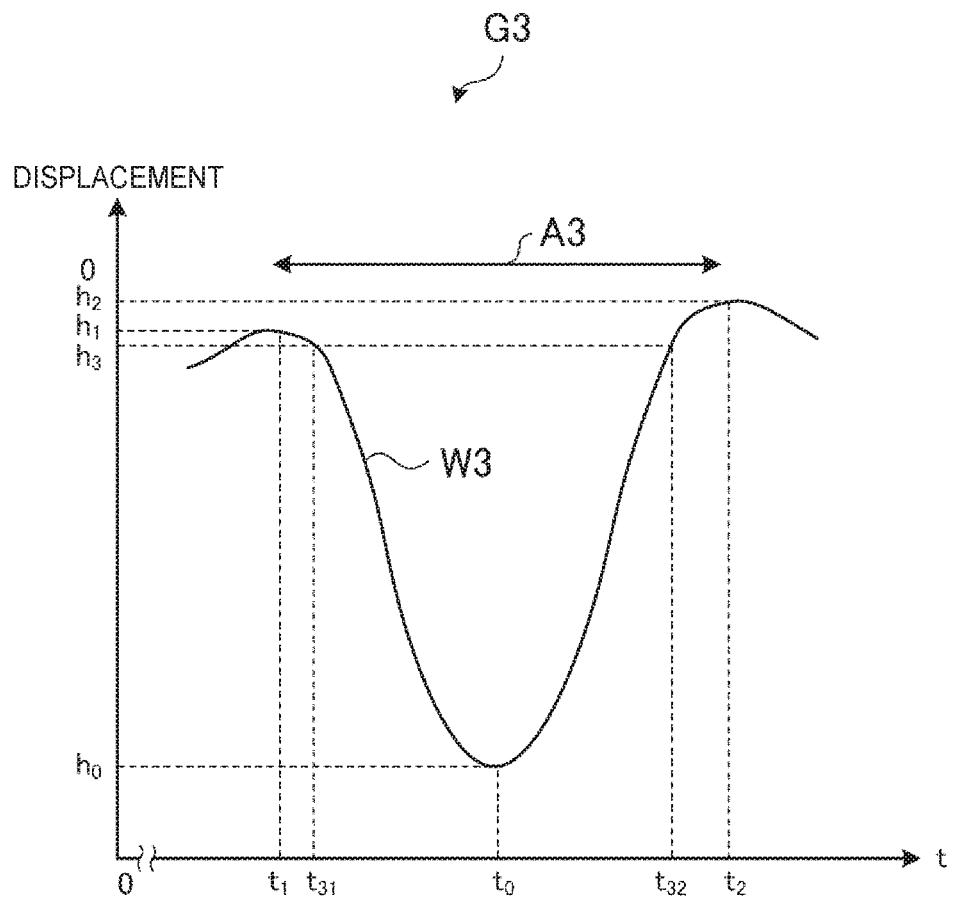
FIG. 10 is a first view illustrating the passing duration of a vehicle.

FIG. 10 is a first view illustrating the passing duration of the vehicle 5. For a graph G3 illustrated in FIG. 10, the horizontal axis indicates time, and the vertical axis indicates displacement. A waveform W3 in the graph G3 indicates the vertical-direction displacement of the floor slab 4d which is generated by an event.

When the vehicle 5 enters the floor slab 4d and runs toward the central portion (the location on which the acceleration sensor 2 is mounted), the crest value of the vertical-direction displacement gradually increases. When the vehicle 5 has run in the central portion, the crest value of the vertical-direction displacement is maximized. In addition, when the vehicle 5 runs away from the central portion, the crest value of the vertical-direction displacement gradually decreases, and, when the vehicle leaves the floor slab 4d, the crest value reaches almost "0". Therefore, the passing duration of the vehicle 5 passing through the floor slab 4d can be estimated from the wave amplitude of the waveform W3 indicated by an arrow A3.

That is, the passing duration computation unit 31 computes the passing duration of the vehicle 5 passing through the floor slab 4d from the wave amplitude of vertical-direction displacement. That is, the passing duration computation unit 31 turns the wave amplitude duration of the vertical-direction displacement into the passing duration of the vehicle 5 passing through the floor slab 4d. In the example of the graph G3, the crest value of the vertical-direction displacement is maximized at a time $t_0$. Therefore, it is found that the vehicle 5 passes through the central portion of the floor slab 4d at the time $t_0$.

The wave amplitude of the vertical-direction displacement is regarded as, for example, a difference between a time $t_1$ at which the vertical-direction displacement reaches an extreme value $h_1$ before a time $t_0$ at which the vertical-direction displacement is minimized during an event and a time $t_2$ at which the vertical-direction displacement reaches an extreme value $h_2$ after a time $t_0$ at which the vertical-direction displacement is minimized. The definition of the wave amplitude of the vertical-direction displacement is not limited thereto. For example, a difference between a time $t_{31}$ at which the vertical-direction displacement generated by an event goes below a predetermined threshold value $h_3$ and a time $t_{32}$ at which the vertical-direction displacement goes above a predetermined threshold value $h_3$ may be regarded as the wave amplitude of the vertical-direction displacement.

As long as the passing duration of the vehicle 5 passing through the floor slab 4d can be computed, it is also possible to estimate the speed of the vehicle 5. For example, the passing duration computation unit 31 is capable of computing the speed of the vehicle 5 passing through the floor slab 4d by dividing the length of the floor slab 4d by the computed passing duration.

The passing duration computation unit 31 may divide the wave amplitude of the vertical-direction displacement generated by an event into multiple sections and compute the passing duration of the vehicle 5 on the floor slab 4d for each of the divided sections. For example, the passing duration computation unit 31 may compute a passing duration taken for the vehicle 5 to enter the floor slab 4d and pass through the central portion of the floor slab 4d and a passing duration taken for the vehicle to run from the central portion of the floor slab 4d and exit the floor slab 4d.

Figure 11:
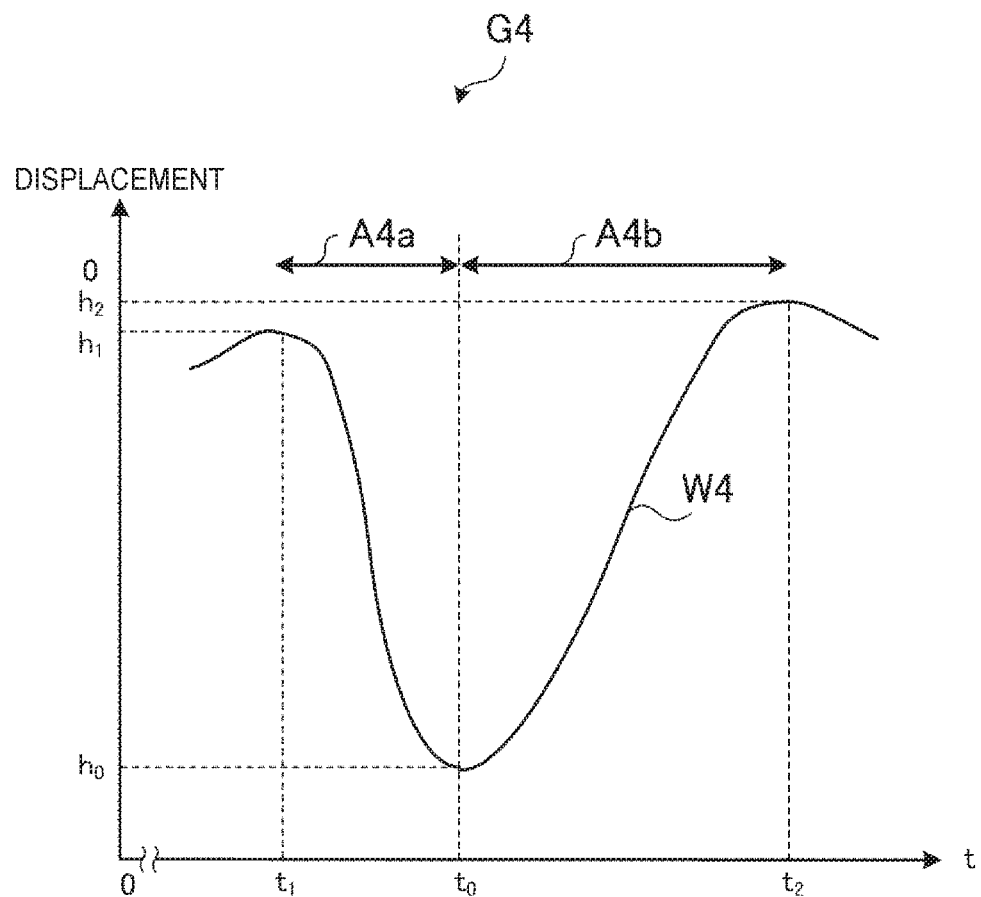
FIG. 11 is a second view illustrating the passing duration of a vehicle.

FIG. 11 is a second view illustrating the passing duration of the vehicle 5. For a graph G4 illustrated in FIG. 11, the horizontal axis indicates time, and the vertical axis indicates displacement. A waveform W4 in the graph G4 indicates the vertical-direction displacement of the floor slab 4d which is generated by an event.

The passing duration computation unit 31 divides the wave amplitude of the vertical-direction displacement generated by an event into multiple sections. For example, as indicated by arrows A4a and A4b, the passing duration computation unit 31 divides the wave amplitude using the time $t_0$ at which the crest value of the vertical-direction displacement is maximized as a boundary. The definition of the wave amplitude of the vertical-direction displacement generated by an event is the same as the definition of the wave amplitude described in FIG. 10.

When the wave amplitude is divided, the passing duration computation unit 31 computes the passing duration of the vehicle 5 on the floor slab 4d for each of the divided wave amplitudes. For example, the time $t_0$ in the graph G4 is a time at which the vehicle 5 has passed through the central portion of the floor slab 4d as described above. Therefore, in a case in which the wave amplitude is divided using the time $t_0$ at which the crest value of the vertical-direction displacement is maximized as a boundary, the passing duration computation unit 31 computes a passing duration taken for the vehicle 5 to enter the floor slab 4d and pass through the central portion of the floor slab 4d and a passing duration taken for the vehicle to run from the central portion of the floor slab 4d and exit the floor slab 4d.

As described above, when the wave amplitude is divided, it is found whether or not the vehicle 5 changes the speed on the floor slab 4d. For example, in the example of the graph G4, as indicated by the arrows A4a and A4b, the passing duration taken for the vehicle to run from the central portion of the floor slab 4d and exit the floor slab 4d becomes longer than the passing duration taken for the vehicle to enter the floor slab 4d and pass through the central portion and thus it is found that the vehicle 5 decreases the speed in the central portion of the floor slab 4d.

Next, the stoppage determination unit 32 will be described. The vertical-direction displacement of the floor slab 4d which is output from the displacement computation unit 24 and the width-direction acceleration which is output from the intrinsic resonance-blocking filter unit 23 are input to the stoppage determination unit 32 (refer to the block BL22 in FIG. 5). The stoppage determination unit 32 determines the stoppage of the vehicle 5 on the floor slab 4d on the basis of the vertical-direction displacement and the width-direction acceleration which have been input.

Figure 12:
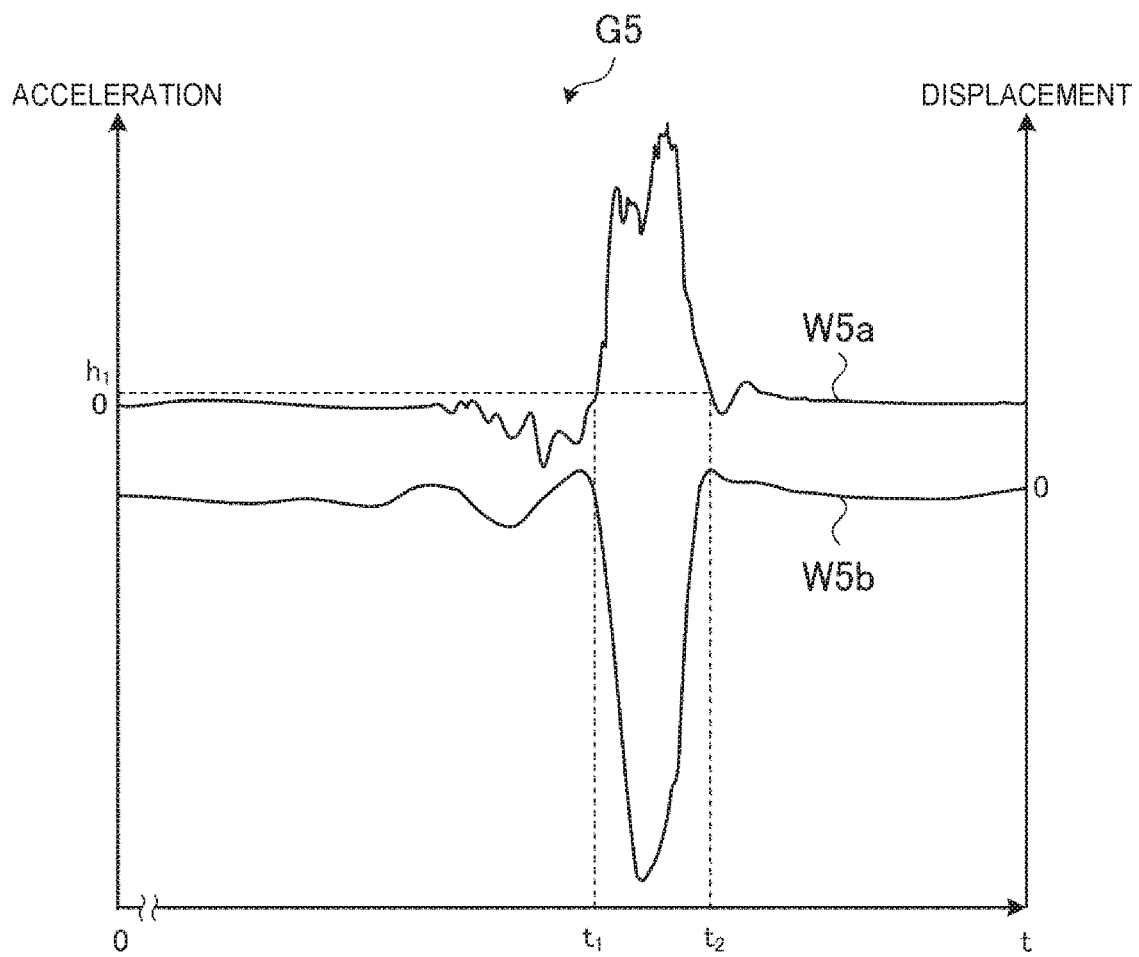
FIG. 12 is a view illustrating an example of width-direction acceleration and vertical-direction displacement in a case in which a vehicle passes through on a floor slab without stopping.

FIG. 12 is a view illustrating an example of width-direction acceleration and vertical-direction displacement in a case in which the vehicle 5 passes through on the floor slab 4d without stopping. For a graph G5 illustrated in FIG. 12, the horizontal axis indicates time. For the graph G5, the left vertical axis indicates acceleration, and the right vertical axis indicates displacement.

A waveform W5a in the graph G5 indicates an example of a temporal change of width-direction displacement. A waveform W5b in the graph G5 indicates an example of a temporal change of vertical-direction displacement. If width-direction acceleration has a "positive" sign when the z axis of the acceleration sensor 2 is oriented upwards with respect to the horizontal direction, the waveform 5a indicates width-direction acceleration in a case in which the vehicle 5 runs along the traffic lane of the arrow A2a illustrated in FIG. 9.

When the vehicle 5 enters the floor slab 4d, the floor slab 4d bends downwards due to the vehicle weight of the vehicle 5. Therefore, width-direction acceleration and vertical-direction acceleration (vertical-direction displacement) are generated in the floor slab 4d. For example, the width-direction acceleration and the vertical-direction displacement in the graph G5 all change immediately after the time $t_1$ (the width-direction acceleration increases, and the vertical-direction displacement decreases). Therefore, the time $t_1$ indicates a time at which the vehicle 5 enters the floor slab 4d.

During the running of the vehicle 5 on the floor slab 4d, width-direction acceleration and vertical-direction displacement are continuously generated in the floor slab 4d. In addition, when the vehicle 5 leaves the floor slab 4d, the vehicle weight of the vehicle 5 is not applied to the floor slab 4d any longer, and thus the width-direction acceleration and the vertical-direction displacement reach almost "0". For example, a time $t_2$ indicates a time at which the vehicle 5 leaves the floor slab 4d, and the width-direction acceleration and the vertical-direction displacement are almost "0" at the time $t_2$ and later.

That is, in a case in which the vehicle 5 runs on the floor slab 4d without stopping, width-direction acceleration and vertical-direction displacement are generated in the floor slab 4d while the vehicle 5 runs on the floor slab 4d. Therefore, in a case in which the vehicle runs on the floor slab 4*d* without stopping, the wave amplitude of width-direction acceleration and the wave amplitude of vertical-direction displacement become almost identical to each other.

The wave amplitude of width-direction acceleration generated by an event is considered to be, for example, a difference between a time $t_1$ at which the crest value of the width-direction acceleration begins to increase and a time $t_2$ at which the crest value of the width-direction acceleration stops to decrease. The definition of the wave amplitude is not limited thereto. For example, a difference between a time at which the crest value of width-direction acceleration generated by an event exceeds a predetermined threshold value $h_1$ and a time at which the crest value turns to be below a predetermined threshold value $h_1$ may be regarded as the wave amplitude.

Figure 13:
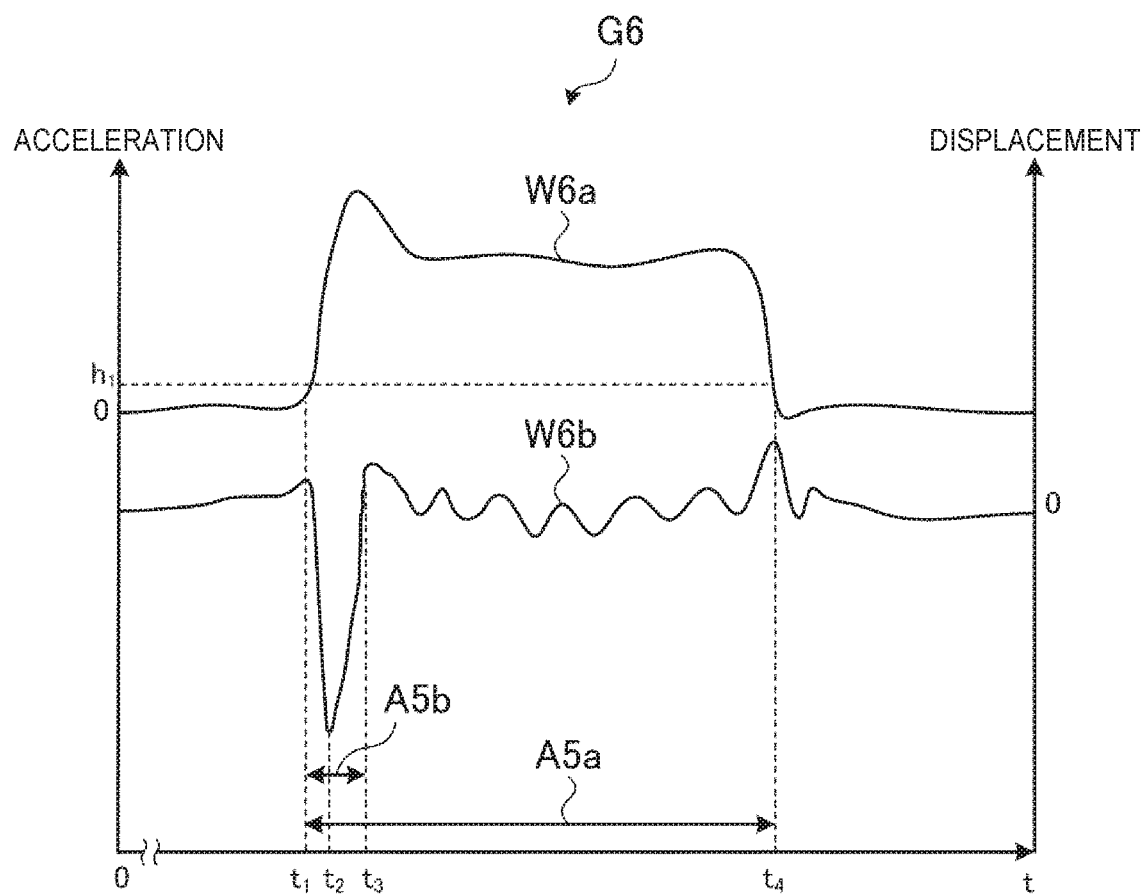
FIG. 13 is a view illustrating an example of width-direction acceleration and vertical-direction displacement in a case in which a vehicle stops on a floor slab.

FIG. 13 is a view illustrating an example of width-direction acceleration and vertical-direction displacement in a case in which the vehicle 5 stops on the floor slab 4*d*. For a graph G6 illustrated in FIG. 13, the horizontal axis indicates time. For a graph G6, the left vertical axis indicates acceleration, and the right vertical axis indicates displacement.

A waveform W6*a* in the graph G6 indicates an example of a temporal change of width-direction acceleration. A waveform W6*b* in the graph G6 indicates an example of a temporal change of vertical-direction displacement.

When the vehicle 5 enters the floor slab 4*d*, the floor slab 4*d* bends downwards due to the vehicle weight of the vehicle 5. Therefore, width-direction acceleration and vertical-direction acceleration (vertical-direction displacement) are generated in the floor slab 4*d*. For example, the width-direction acceleration and the vertical-direction displacement in the graph G6 all change immediately after the time $t_1$ (the width-direction acceleration increases, and the vertical-direction displacement decreases). Therefore, the time $t_1$ indicates a time at which the vehicle 5 enters the floor slab 4*d*.

Even when the vehicle 5 stops on the floor slab 4*d*, width-direction acceleration is continuously generated until the vehicle 5 leaves the floor slab 4*d*. For example, a time $t_4$ indicates a time at which the vehicle 5 leaves the floor slab 4*d*, and width-direction acceleration is continuously generated between the time $t_1$ at which the vehicle 5 enters the floor slab 4*d* and the time $t_4$ at which the vehicle leaves the floor slab.

On the other hand, when the vehicle 5 stops on the floor slab 4*d*, the vertical-direction displacement returns to zero (0) to a certain extent as indicated by the waveform W6*b*. For example, when the peak is suppressed as illustrated at the time $t_2$, later (for example, a time $t_3$), the vertical-direction displacement returns to zero to a certain extent. The time $t_2$ at which the vertical-direction displacement peaks is a time at which the vehicle 5 stops.

That is, in a case in which the vehicle 5 stops on the floor slab 4*d*, width-direction acceleration is continuously generated until the vehicle 5 leaves as in a case in which the vehicle 5 does not stop on the floor slab 4*d*. On the other hand, the vertical-direction displacement returns to almost zero after the vehicle 5 stops unlike a case in which the vehicle 5 does not stop on the floor slab 4*d*. That is, in a case in which the vehicle 5 stops on the floor slab 4*d*, the wave amplitude of width-direction acceleration and the wave amplitude of vertical-direction displacement are different from each other. For example, the wave amplitude of the width-direction acceleration indicated by an arrow A5*a* in the graph G6 and the wave amplitude of the vertical-direction displacement indicated by an arrow A5*b* are significantly different from each other.

According to what has been described above, the stoppage determination unit 32 determines the stoppage of the vehicle 5 on the floor slab 4*d* on the basis of the wave amplitude of width-direction acceleration and the wave amplitude of vertical-direction displacement. For example, in a case in which the wave amplitude of width-direction acceleration is larger by a predetermined value than the wave amplitude of vertical-direction displacement, the stoppage determination unit 32 determines the stoppage of the vehicle 5 on the floor slab 4*d*. Specifically, in a case in which the wave amplitude of width-direction acceleration is twice or larger the wave amplitude of vertical-direction displacement, the stoppage determination unit 32 determines the stoppage of the vehicle 5 on the floor slab 4*d*.

As described above, the time $t_2$ at which the vertical-direction displacement peaks indicates a time at which the vehicle 5 stops on the floor slab 4*d*. In addition, the time $t_4$ at which the crest value of the width-direction acceleration stops to decrease (a time at which the wave amplitude of the width-direction acceleration ends) indicates a time at which the vehicle 5 leaves the floor slab 4*d*. Therefore, the stoppage determination unit 32 is capable of computing (estimating) a difference between the time $t_2$ at which the vertical-direction displacement peaks and the time $t_4$ at which the crest value of the width-direction acceleration stops to decrease as a stoppage time at which the vehicle 5 stops on the floor slab 4*d*.

Next, the path change determination unit 33 will be described. Width-direction acceleration that is output from the intrinsic resonance-blocking filter unit 23 is input to the path change determination unit 33 (refer to the block BL23 in FIG. 5). The path change determination unit 33 determines the path changes of the vehicle 5 on the floor slab 4*d* on the basis of the input width-direction acceleration.

Figure 14:
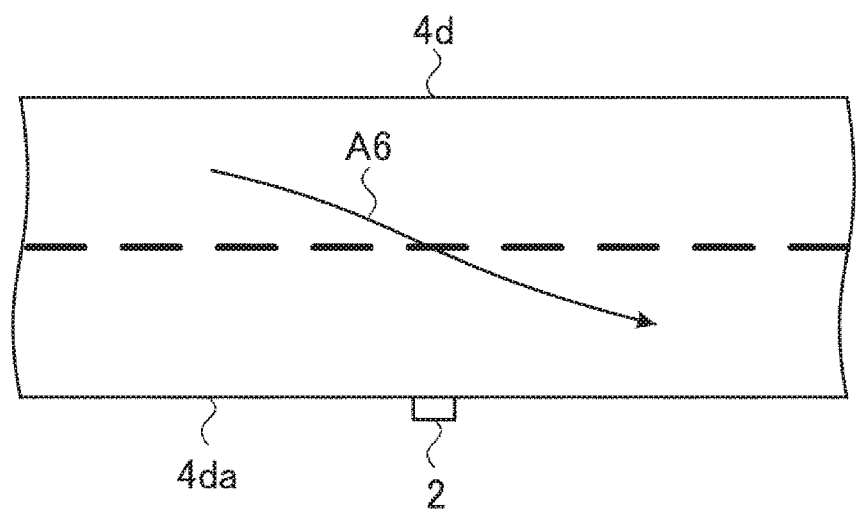
FIG. 14 is a first view illustrating a path change of a vehicle on a floor slab.

FIG. 14 is a first view illustrating a path change of the vehicle 5 on the floor slab 4*d*. In FIG. 14, the floor slab 4*d* illustrated in FIG. 2 and the acceleration sensor 2 mounted on the side surface 4*da* of the floor slab 4*d* are illustrated. As indicated by an arrow A6 in FIG. 14, the vehicle 5 is considered to run beyond the central portion of the floor slab 4*d* in a direction intersecting at right angles a regulation direction (for example, a central traffic lane) and change the path from a traffic lane far from the acceleration sensor 2 to a traffic lane close to the acceleration sensor 2.

Figure 15:
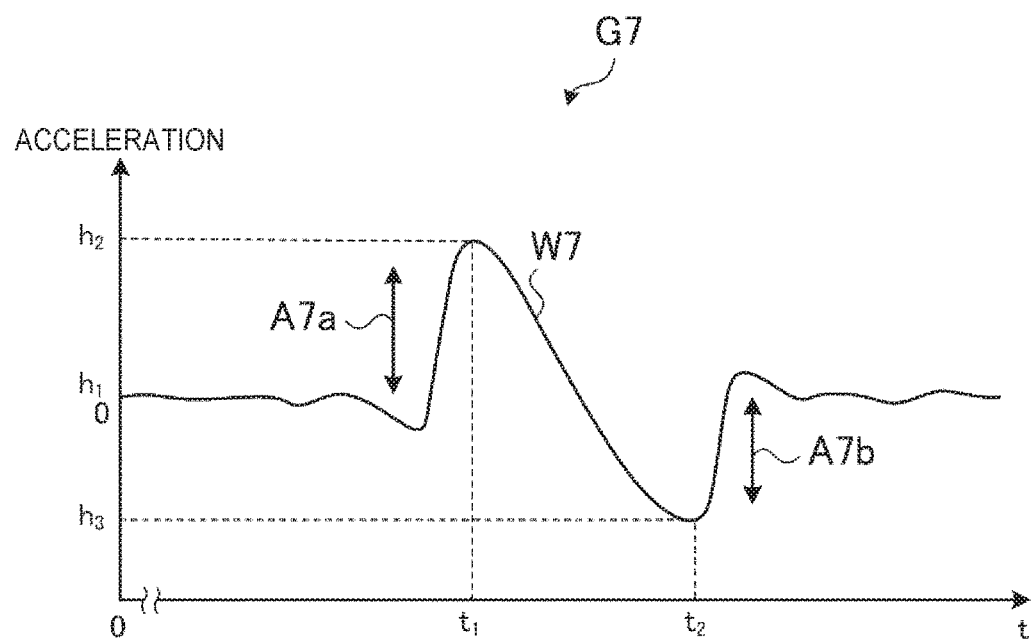
FIG. 15 is a view illustrating a change in the width-direction acceleration during the path change of a vehicle in FIG. 14.

FIG. 15 is a view illustrating a change in the width-direction acceleration during the path change of FIG. 14. For a graph G7 illustrated in FIG. 15, the horizontal axis indicates time, and the vertical axis indicates acceleration. A waveform W7 in the graph G7 indicates width-direction acceleration of the floor slab 4*d* which is generated by an event.

Before the path change, the vehicle 5 runs along the traffic lane far from the acceleration sensor 2. Therefore, width-direction acceleration being generated in the floor slab 4*d* continuously has a positive crest value (for example, refer to FIG. 9) as indicated by an arrow A7*a*. In addition, as the vehicle 5 changes the path toward the traffic lane close to the acceleration sensor 2, width-direction acceleration being generated in the floor slab 4*d* continuously has a negative crest value (for example, refer to FIG. 8) as indicated by an arrow A7*b*. In addition, when the vehicle 5 leaves the floor slab 4*d*, width-direction acceleration reaches almost "0".

The crest value of the width-direction acceleration is regarded as, for example, a difference between a value $h_1$ at which the crest value of the width-direction acceleration before the event is almost constant and values $h_2$ and $h_3$ at which the crest value of the width-direction acceleration during the event peaks. The value $h_1$ may be set to "0". The definition of the crest value of the width-direction acceleration is not limited thereto.

Figure 16:
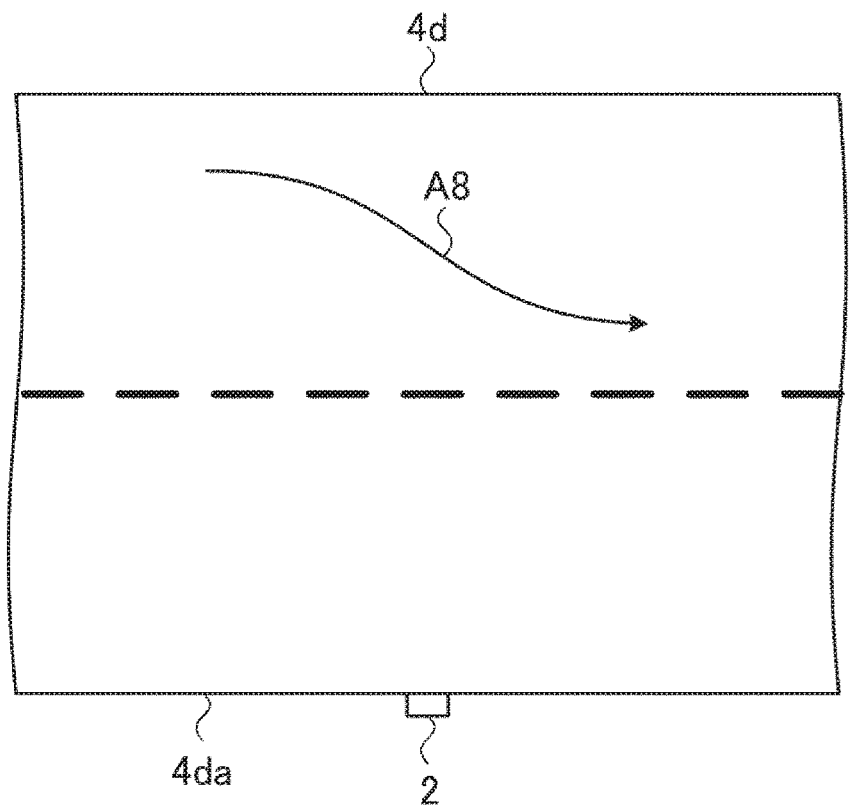
FIG. 16 is a second view illustrating a path change of a vehicle on a floor slab.

FIG. 16 is a second view illustrating a path change of the vehicle 5 on the floor slab 4d. In FIG. 16, the floor slab 4d illustrated in FIG. 2 and the acceleration sensor 2 mounted on the side surface 4da of the floor slab 4d are illustrated. As indicated by an arrow A8 in FIG. 16, the vehicle 5 is considered to change the path without running beyond the central portion of the floor slab 4d in a direction intersecting at right angles the regulation direction.

Figure 17:
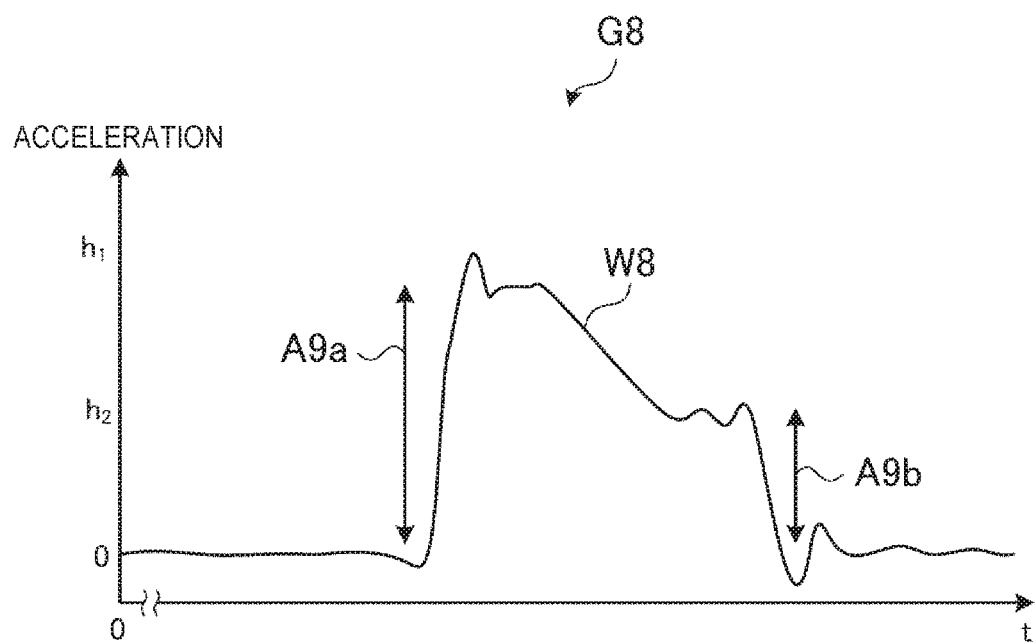
FIG. 17 is a view illustrating a change in the width-direction acceleration during the path change of a vehicle in FIG. 16.

FIG. 17 is a view illustrating a change in the width-direction acceleration during the path change of FIG. 16. For a graph G8 illustrated in FIG. 17, the horizontal axis indicates time, and the vertical axis indicates acceleration. A waveform W8 in the graph G8 indicates width-direction acceleration of the floor slab 4d which is generated by an event.

Before the path change, the vehicle 5 runs along the traffic lane far from the acceleration sensor 2. Therefore, width-direction acceleration being generated in the floor slab 4d continuously has a positive crest value as indicated by an arrow A9a.

After that, the vehicle 5 changes the path toward the traffic lane close to the acceleration sensor 2 but does not run beyond the central portion of the floor slab 4d in a direction intersecting at right angles the regulation direction. Therefore, for width-direction acceleration generated in the floor slab 4d, as indicated by the arrow A9b, the sign thereof remains positive, and the crest value decreases. In addition, when the vehicle 5 leaves the floor slab 4d, the width-direction acceleration reaches almost "0".

As described using FIGS. 14 to 17, when the vehicle 5 changes the path on the floor slab 4d, the sign of the crest value of the width-direction acceleration changes. In addition, when the vehicle 5 changes the path on the floor slab 4d, the crest value of the width-direction acceleration changes. In addition, the path change determination unit 33 determines the path change of the vehicle 5 on the floor slab 4d on the basis of the crest value and sign of width-direction acceleration.

Specifically, in the example of the waveform W7 in FIG. 15, the sign of the crest value changes as indicated by the arrows A7a and 7b. Therefore, the path change determination unit 33 determines that the vehicle 5 changes the path on the floor slab 4d. In addition, in the example of the waveform W8 in FIG. 17, a first crest value continues as indicated by the arrow A9a, and then a second crest value which is smaller than the first crest value and has the same sign as the first crest value continues as indicated by the arrow A9b. Therefore, the path change determination unit 33 determines that the vehicle 5 changes the path on the floor slab 4d.

The path change determination unit 33 is capable of determining how the vehicle 5 changes the path using changes in the sign of the crest value and the degree of the crest value of the width-direction acceleration. For example, in a case in which the vehicle 5 changes the path from the traffic lane close to the acceleration sensor 2 to the far traffic lane by running beyond the central portion of the floor slab 4d in a direction intersecting at right angles the regulation direction, for the width-direction acceleration, a negative crest value continues in the beginning, and then a positive crest value continues. In addition, in a case in which the vehicle 5 changes the path from the traffic lane close to the acceleration sensor 2 to the traffic lane far from the acceleration sensor 2 without running beyond the central portion of the floor slab 4d in a direction intersecting at right angles the regulation direction, the crest value decreases while the sign of the width-direction acceleration remains negative. As described above, the sign and degree of the crest value of the width-direction acceleration change due to the path change of the vehicle 5, and thus the path change determination unit 33 is capable of determining the changed path directions of the vehicle 5.

In addition, the definition of the crest value is the same as the definition described using FIG. 15.

Next, the entering direction determination unit 34 will be described. Width-direction acceleration that is output from the intrinsic resonance-blocking filter unit 23 and width-direction acceleration that is output from the vehicle component-blocking filter unit 25 are input to the entering direction determination unit 34 (refer to the block BL24 in FIG. 5). The entering direction determination unit computes the absolute value of the width-direction acceleration that is output from the vehicle component-blocking filter unit 25 and computes the envelope curve of the computed absolute value. In addition, the entering direction determination unit 34 determines the entering direction of the vehicle 5 into the floor slab 4d on the basis of the computed envelope curve and the width-direction acceleration that is output from the intrinsic resonance-blocking filter unit 23.

Figure 18:
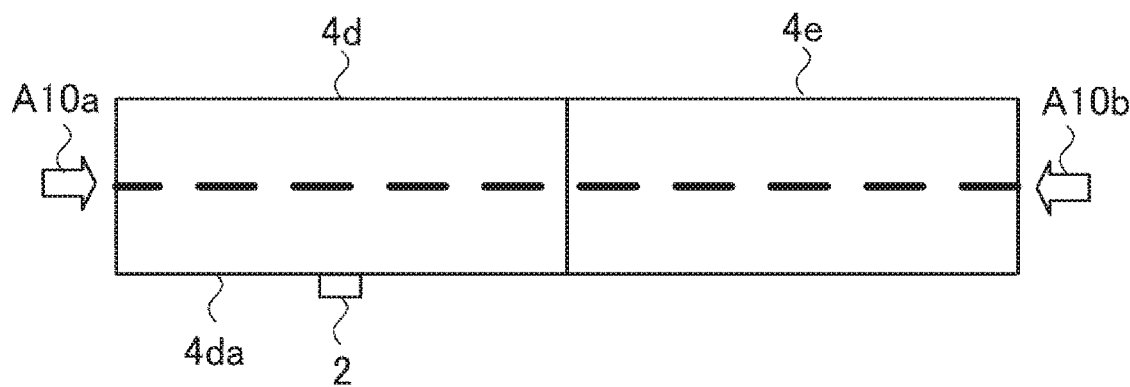
FIG. 18 is a view illustrating the entering direction of a vehicle into a floor slab.

FIG. 18 is a view illustrating the entering direction of the vehicle 5 into the floor slab 4d. In FIG. 18, the floor slabs 4d and 4e illustrated in FIG. 2 and the acceleration sensor 2 mounted on the side surface 4da of the floor slab 4d are illustrated.

As the entering direction of the vehicle 5 into the floor slab 4d, there are a direction in which the vehicle enters the floor slab 4d without passing through the adjacent floor slab 4e (for example, directly from roads) as indicated by an arrow A10a and a direction in which the vehicle enters the floor slab 4d from the adjacent floor slab 4e as indicated by an arrow A10b.

Figure 19:
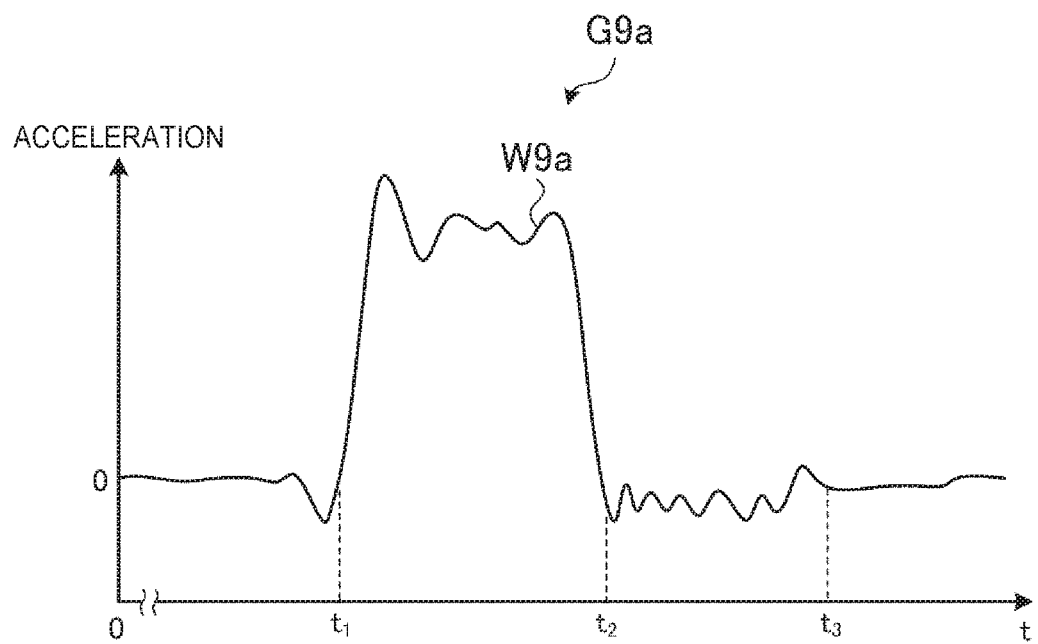
FIG. 19 is a view illustrating width-direction acceleration and an envelope curve thereof in a case in which a vehicle directly enters a floor slab on which an acceleration sensor is mounted.
Figure 19:
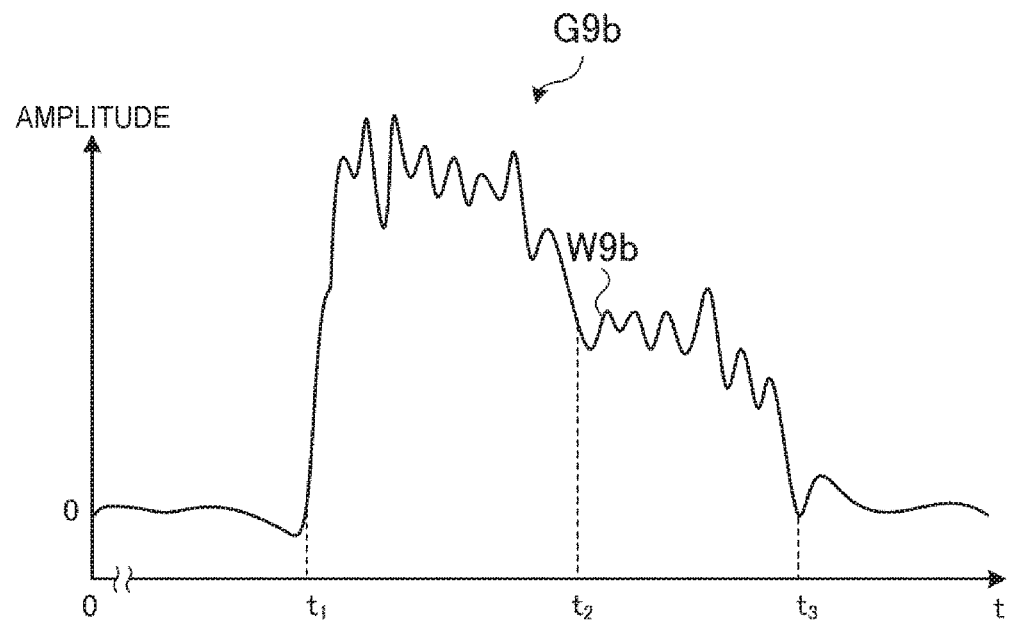

FIG. 19 is a view illustrating width-direction acceleration and an envelope curve thereof in a case in which the vehicle 5 directly enters the floor slab 4d on which the acceleration sensor 2 is mounted. For a graph G9a illustrated in FIG. 19, the horizontal axis indicates time, and the vertical axis indicates acceleration. For a graph G9b, the horizontal axis indicates time, and the vertical axis indicates amplitude.

A waveform W9a in the graph G9a indicates width-direction acceleration that is output from the intrinsic resonance-blocking filter unit 23. A waveform W9b in the graph G9b indicates an envelope curve that is computed using the entering direction determination unit 34.

When the vehicle 5 enters the floor slab 4d from a direction indicated by the arrow A10a in FIG. 18, the floor slab 4d bends downwards due to the vehicle weight of the vehicle 5, and acceleration is generated in the width direction. The waveform W9a from the time $t_1$ to the time $t_2$ indicates width-direction acceleration while the vehicle 5 enters the floor slab 4d from the direction indicated by the arrow A10a in FIG. 18 and leaves the floor slab 4d.

In a case in which the vehicle 5 enters the floor slab 4d from the direction indicated by the arrow A10a in FIG. 18, when the vehicle leaves the floor slab 4d, the vehicle enters the adjacent floor slab 4e on which the acceleration sensor 2 is not mounted. When the vehicle 5 enters the adjacent floor slab 4e, the floor slab 4d does not bend downwards due to the vehicle weight of the vehicle 5, and thus width-direction acceleration generated by the vehicle weight of the vehicle 5 as indicated by the waveform W9a from the time $t_1$ to the time $t_{-2}$ is not generated after the time $t_2$.

However, while the vehicle 5 runs in the floor slab 4e adjacent to the floor slab 4d, vibrations of the floor slab 4e which are generated by the running of the vehicle 5 are transferred to the floor slab 4d. The vibrations transferred from the adjacent floor slab 4e to the floor slab 4d are detected using the acceleration sensor 2 mounted on the floor slab 4d and appear in a form of width-direction acceleration indicated by the waveform W9a from the time $t_2$ to the time $t_3$. The width-direction acceleration indicated by the waveform W9a from the time $t_2$ to the time $t_3$ is considered to result from the intrinsic resonance of the floor slab 4d which is generated by the vibrations transferred from the floor slab 4e.

The time $t_3$ indicates a time at which the vehicle 5 leaves the floor slab 4e. After the time $t_3$, the width-direction acceleration reaches almost "0".

The waveform W9a indicates the width-direction acceleration that is output from the intrinsic resonance-blocking filter unit 23. That is, the waveform W9a indicates width-direction acceleration for which high-frequency components due to the intrinsic resonance of the floor slab 4d are suppressed. Therefore, in the floor slab 4d, width-direction acceleration that is greater than the width-direction acceleration indicated by the waveform W9a from the time $t_2$ to the time $t_3$ is generated.

As described above, the entering direction determination unit 34 computes the absolute value of width-direction acceleration that is output from the vehicle component-blocking filter unit 25 and computes the envelope curve of the computed absolute value. In the width-direction acceleration that is output from the vehicle component-blocking filter unit 25, acceleration components generated by the passing of the vehicle 5 are suppressed, and acceleration components due to the intrinsic resonance of the floor slab 4d pass through. Therefore, the envelope curve computed using the entering direction determination unit 34 becomes the envelope curve of acceleration based on at least the intrinsic resonance of the floor slab 4d, and it is possible to detect the passing of the vehicle 5 on the floor slab 4e adjacent to the floor slab 4d in a form of a large amplitude of the envelope curve of width-direction acceleration as indicated by the waveform W9b from the time $t_2$ to the time $t_3$.

That is, in a case in which the vehicle 5 runs from the floor slab 4d on which the acceleration sensor 2 is mounted to the floor slab 4e on which the acceleration sensor 2 is not mounted, the waveform W9b has a predetermined amplitude while the vehicle 5 runs in the adjacent floor slab 4e (from the time $t_2$ to the time $t_3$) even after the crest value of the waveform W9a becomes small (after the time $t_2$).

Figure 20:
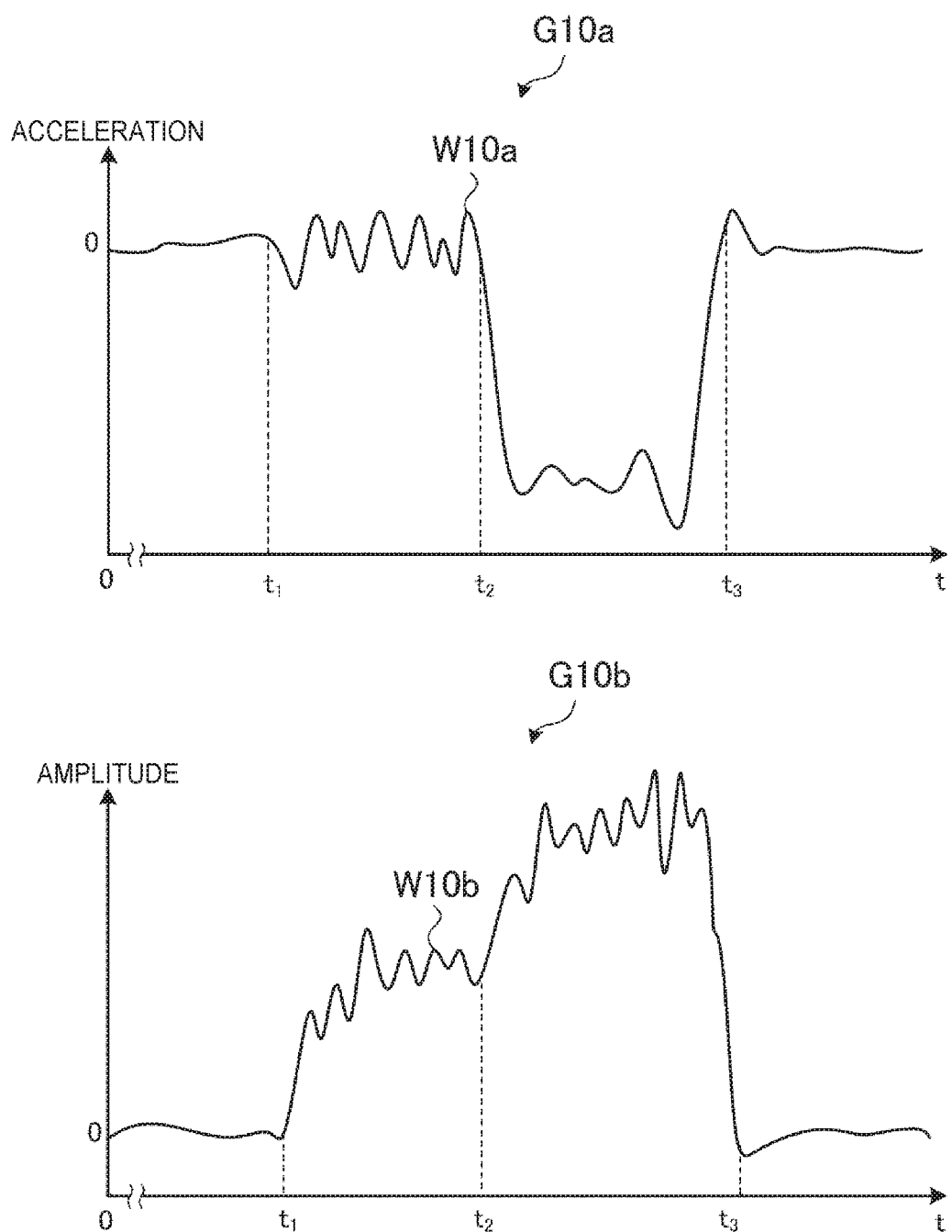
FIG. 20 is a view illustrating width-direction acceleration and an envelope curve thereof in a case in which a vehicle enters from an adjacent floor slab on which an acceleration sensor is not mounted.

FIG. 20 is a view illustrating width-direction acceleration and an envelope curve thereof in a case in which the vehicle 5 enters from the adjacent floor slab 4e on which the acceleration sensor 2 is not mounted. For a graph G10a illustrated in FIG. 20, the horizontal axis indicates time, and the vertical axis indicates acceleration. For a graph G10b, the horizontal axis indicates time, and the vertical axis indicates amplitude.

A waveform W10a in the graph G10a indicates width-direction acceleration that is output from the intrinsic resonance-blocking filter unit 23. A waveform W10b in the graph G10b indicates an envelope curve that is computed using the entering direction determination unit 34.

When the vehicle 5 enters the floor slab 4e from a direction indicated by the arrow A10b in FIG. 18, vibrations of the floor slab 4e which are generated by the running of the vehicle 5 are transferred to the floor slab 4d. The vibrations transferred from the floor slab 4e to the floor slab 4d are detected using the acceleration sensor 2 mounted on the floor slab 4d and appear in a form of width-direction acceleration indicated by the waveform W10a from the time $t_1$ to the time $t_2$. The width-direction acceleration indicated by the waveform W10a from the time $t_1$ to the time $t_2$ is considered to result from the intrinsic resonance of the floor slab 4d which is generated by the vibrations transferred from the floor slab 4e.

In a case in which the vehicle 5 enters the floor slab 4e from the direction indicated by the arrow A10b in FIG. 18, when the vehicle leaves the floor slab 4e, the vehicle enters the floor slab 4d on which the acceleration sensor 2 is mounted. When the vehicle 5 enters the floor slab 4d, the floor slab 4d bends downwards due to the vehicle weight of the vehicle 5. Therefore, width-direction acceleration generated by the vehicle weight of the vehicle 5 as indicated by the waveform W10a from the time $t_2$ to the time $t_3$ is generated in the floor slab 4d.

The time $t_3$ indicates a time at which the vehicle 5 leaves the floor slab 4d. After the time $t_3$, the width-direction acceleration reaches almost "0".

As described above, the entering direction determination unit 34 computes the absolute value of width-direction acceleration that is output from the vehicle component-blocking filter unit 25 and computes the envelope curve of the computed absolute value. In the width-direction acceleration that is output from the vehicle component-blocking filter unit 25, acceleration components generated by the passing of the vehicle 5 are suppressed, and acceleration components due to the intrinsic resonance of the floor slab 4d pass through. Therefore, the envelope curve computed by the entering direction determination unit 34 becomes the envelope curve of acceleration based on at least the intrinsic resonance of the floor slab 4d, and it is possible to detect the passing of the vehicle 5 on the floor slab 4e adjacent to the floor slab 4d in a form of a large amplitude of an envelope curve of width-direction acceleration as indicated by the waveform W10b from the time $t_2$ to the time $t_3$.

That is, in a case in which the vehicle 5 runs from the floor slab 4e on which the acceleration sensor 2 is not mounted to the floor slab 4d on which the acceleration sensor 2 is mounted, the waveform W10b has a predetermined amplitude even before the crest value of the waveform W10a becomes large (before the time $t_2$) due to the entering of the vehicle 5 into the floor slab 4e.

According to what has been described above, the entering direction determination unit 34 is capable of determining the entering direction of the vehicle 5 into the floor slab 4d on the basis of the appearance time of the envelope curve with respect to the width-direction acceleration that is output from the intrinsic resonance-blocking filter unit 23. For example, the entering direction determination unit 34 is capable of determining the entering direction on the basis of whether an envelope curve appears before width-direction acceleration appears or an envelope curve appears even after width-direction acceleration does not appear any longer.

For example, as illustrated in FIG. 19, in a case in which an envelope curve (the waveform W9b) of width-direction acceleration appears even after width-direction acceleration due to an event (width-direction acceleration of the waveform W9a from the time $t_1$ to the time $t_2$) does not appear any longer (after the time $t_2$), the entering direction determination unit 34 determines that the vehicle 5 enters from a direction of the arrow A10a in FIG. 18. Specifically, in a case in which an envelope curve of width-direction acceleration has an amplitude with a predetermined duration and a predetermined threshold value or higher even after width-direction acceleration due to an event does not appear any longer, the entering direction determination unit 34 determines that the vehicle 5 enters the floor slab 4d in a direction opposite to the adjacent floor slab 4e.

In addition, as illustrated in FIG. 20, in a case in which an envelope curve (the waveform W10b) of width-direction acceleration appears before width-direction acceleration due to an event (width-direction acceleration of the waveform W10a from the time $t_2$ to the time $t_3$) is generated (before the time $t_2$), the entering direction determination unit 34 determines that the vehicle 5 enters from a direction of the arrow A10b in FIG. 18. Specifically, in a case in which an envelope curve of width-direction acceleration has an amplitude with a predetermined duration and a predetermined threshold value or higher before width-direction acceleration due to an event is generated, the entering direction determination unit 34 determines that the vehicle 5 enters the floor slab 4d from the adjacent floor slab 4e.

Hereinafter, the operation of the measurement instrument 1 will be described using a flowchart.

Figure 21:
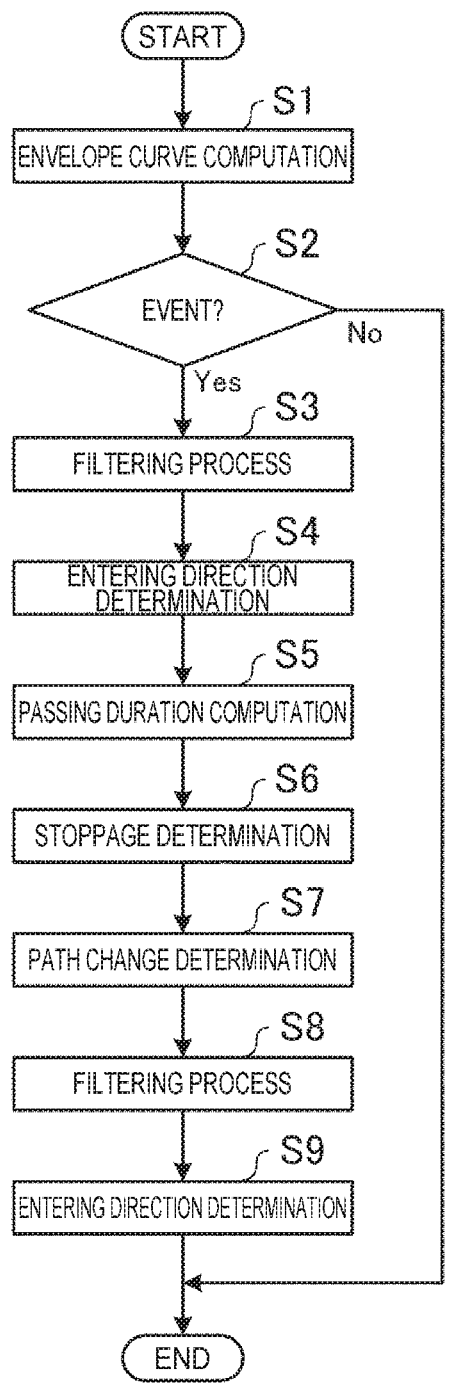
FIG. 21 is a flowchart illustrating an operation example of the measurement instrument.

FIG. 21 is a flowchart illustrating an operation example of the measurement instrument 1. The measurement instrument 1 repeatedly executes the processes in the flowchart illustrated in FIG. 21, for example, at a timing at which the acceleration sensor 2 outputs acceleration.

First, the acquisition unit 21 acquires acceleration of the acceleration sensor 2 which has been sent using the communication unit 12 (Step S1).

Next, the event detection unit 22 detects an event on the basis of vertical-direction acceleration included in the acceleration acquired in Step S1 (Step S2). In a case in which an event is detected ("Yes" in S2), the event detection unit 22 transfers the process to Step S3. In a case in which no event is detected ("No" in S2), the event detection unit 22 terminates the process of the flowchart. In addition, the measurement instrument 1 executes the process of Step S1 again at a timing at which the acceleration sensor 2 outputs acceleration.

In Step S2, in a case in which an event is determined to be detected ("Yes" in S2), the intrinsic resonance-blocking filter unit 23 suppresses the intrinsic resonance frequency of the floor slab 4d which is included in the width-direction acceleration and the vertical-direction acceleration (Step S3).

Next, the displacement computation unit 24 computes the vertical-direction displacement of the floor slab 4d from the vertical-direction acceleration for which the intrinsic resonance frequency of the floor slab 4d is suppressed in Step S3 (Step S4). For example, the displacement computation unit 24 computes the vertical-direction displacement of the floor slab 4d by integrating the vertical-direction acceleration for which the intrinsic resonance frequency of the floor slab 4d is suppressed twice.

Next, the passing duration computation unit 31 computes the passing duration of the vehicle 5 that has passed through the floor slab 4d (Step S5). For example, the passing duration computation unit 31 computes the passing duration of the vehicle 5 that has passed through the floor slab 4d on the basis of the wave amplitude duration of the vertical-direction displacement of the floor slab 4d which has been computed in Step S4 (for example, refer to FIGS. 10 and 11).

Next, the stoppage determination unit 32 determines the stoppage of the vehicle 5 on the floor slab 4d (Step S6). For example, the stoppage determination unit 32 determines the stoppage of the vehicle 5 on the floor slab 4d on the basis of the wave amplitude of the width-direction acceleration for which the intrinsic resonance components of the floor slab 4d is suppressed in Step S3 and the wave amplitude of the vertical-direction displacement of the floor slab 4d which has been computed in Step S4 (for example, refer to FIG. 13).

Next, the path change determination unit 33 determines the path changes of the vehicle 5 on the floor slab 4d (Step S7). For example, the path change determination unit 33 determines the path changes of the vehicle 5 on the floor slab 4d on the basis of changes in the amplitude of the width-direction acceleration for which the intrinsic resonance components of the floor slab 4d is suppressed in Step S3 (for example, refer to FIGS. 15 and 17).

Next, the vehicle component-blocking filter unit suppresses acceleration components generated by the bending of the floor slab caused by the passing of the vehicle 5 which are included in the width-direction acceleration (Step S8).

Next, the entering direction determination unit 34 determines the entering direction of the vehicle 5 into the floor slab 4d (Step S9). For example, the entering direction determination unit 34 determines the entering direction of the vehicle 5 into the floor slab 4d on the basis of the width-direction acceleration for which the intrinsic resonance components of the floor slab 4d is suppressed in Step S3 and the envelope curve of the width-direction acceleration for which the frequency component generated by the bending of the floor slab caused by the passing of the vehicle 5 in Step S8 is suppressed (for example, refer to FIGS. 19 and 20). When the process of Step S9 is terminated, the measurement instrument 1 terminates the process of the flowchart and executes the process of Step S1 again at a timing at which the acceleration sensor 2 outputs acceleration.

The processing sequence of the measurement instrument 1 is not limited to the flowchart of FIG. 21. For example, the processes of Steps S5, S6, S7, and S9 are not limited to the sequence in the flowchart of FIG. 21. In addition, the processes of Steps S5, S6, S7, and S9 may be executed in parallel. However, the filtering process of Step S8 is executed at least before the entering direction determination process of Step S9.

As described above, the acquisition unit 21 in the measurement instrument 1 acquires at least one of the vertical-direction acceleration and the width-direction acceleration of the floor slab 4d from the acceleration sensor 2 provided in the floor slab 4d on which the vehicle passes through. In addition, the analysis unit 26 analyzes the motion of the vehicle 5 passing through on the floor slab 4d on the basis of at least one of the vertical-direction acceleration and the width-direction acceleration acquired by the acquisition unit 21. In such a case, the measurement instrument 1 analyzes the motion of moving objects on structures using small-size and simple system constitutions and is capable of reducing costs or saving efforts for installation of sensors. For example, the measurement instrument 1 does not need to analyze the motion of the vehicle 5 using a variety of sensors and is capable of reducing costs. In addition, the measurement instrument 1 is capable of analyzing the motion of the vehicle 5 from at least one acceleration sensor 2 and saves efforts for the installation of sensors on the floor slab 4d.

In addition, the intrinsic resonance-blocking filter unit 23 suppresses the intrinsic resonance frequency of the floor slab 4d which is included in the width-direction acceleration and the vertical-direction acceleration and has no relationship with the analysis of the motion of the vehicle 5. In such a case, the analysis unit 26 is capable of appropriately analyzing the motion of the vehicle 5.

In addition, the vehicle component-blocking filter unit 25 suppresses acceleration components due to the vehicle 5 which are included in the width-direction acceleration and allows the passing of the intrinsic resonance frequency of the floor slab 4d. In such a case, the analysis unit 26 is capable of appropriately determining the entering direction of the vehicle 5.

In addition, the analysis unit 26 analyzes the motion of the vehicle 5 in accordance with event detection in the event detection unit 22. In such a case, the analysis unit 26 is capable of reducing processing loads.

The display unit 14 may output the results of event detection detected using the event detection unit 22, the analysis results of the motion of the vehicle 5 which are analyzed using the analysis unit 26, and the like to display devices. In such a case, users are able to learn, for example, the motion of the vehicle 5 passing through on the floor slab 4d.

In addition, in the above description, the analysis of the motion of the vehicle 5 has been described for an example of one traffic lane on a single side, but the invention is not limited thereto. For example, the measurement instrument 1 is also capable of analyzing the motion of the vehicle 5 on floor slabs not including traffic lanes. In addition, the measurement instrument 1 is also capable of analyzing the motion of the vehicle 5 on floor slabs including two or more traffic lanes on a single side.

In addition, in a case in which the floor slab 4d includes one traffic lane on a single side, the measurement instrument 1 is capable of determining whether or not the vehicle 5 or the like runs along the traffic lane from the sign of the width-direction acceleration. For example, in a case in which the width-direction acceleration has a "negative" sign, the measurement instrument 1 is capable of determining that the vehicle 5 passes through a traffic lane far from the acceleration sensor 2 (for example, refer to FIG. 8). In addition, in a case in which the width-direction acceleration has a "positive" sign, the measurement instrument 1 is capable of determining that the vehicle 5 passes through a traffic lane close to the acceleration sensor 2 (for example, refer to FIG. 9).

In addition, in a case in which the floor slab 4d includes one traffic lane on a single side and a traffic lane along which the vehicle 5 runs has been determined between right and left traffic lanes, the measurement instrument 1 is capable of determining the entering direction of the vehicle 5 from the sign of the width-direction acceleration. For example, it is assumed that the vehicle 5 needs to keep to the left. In this case, in a case in which the width-direction acceleration has a "negative" sign, the measurement instrument 1 is capable of determining that, for example, the vehicle 5 enters from a direction of the adjacent floor slab 4e. In addition, in a case in which the width-direction acceleration has a "positive" sign, the measurement instrument 1 is capable of determining that, for example, the vehicle 5 enters from a direction opposite to the adjacent floor slab 4e. In a case in which the floor slab 4d includes one traffic lane on a single side and a traffic lane along which the vehicle 5 runs has been determined between right and left traffic lanes, the measurement instrument 1 is capable of determining the entering direction of the vehicle 5 even when the adjacent floor slab 4e is not present (for example, only the floor slab 4d is present).

In addition, the analysis unit 26 computes the passing duration of the vehicle 5 on the basis of the vertical-direction displacement, but may compute the passing duration of the vehicle 5 on the basis of the width-direction direction acceleration. For example, the analysis unit 26 may compute the passing duration of the vehicle 5 on the basis of the wave amplitude of the width-direction acceleration.

In addition, the analysis unit 26 may compare the respective wave amplitudes of the waveforms of the vertical-direction displacement and the width-direction acceleration and compute the passing duration. For example, the analysis unit 26 may compute a duration during which the wave amplitudes of the vertical-direction displacement and the width-direction acceleration superimpose each other as the passing duration.

Second Embodiment

In a second embodiment, the preservation (storage) of width-direction acceleration and vertical-direction displacement when an event is generated will be described.

Figure 22:
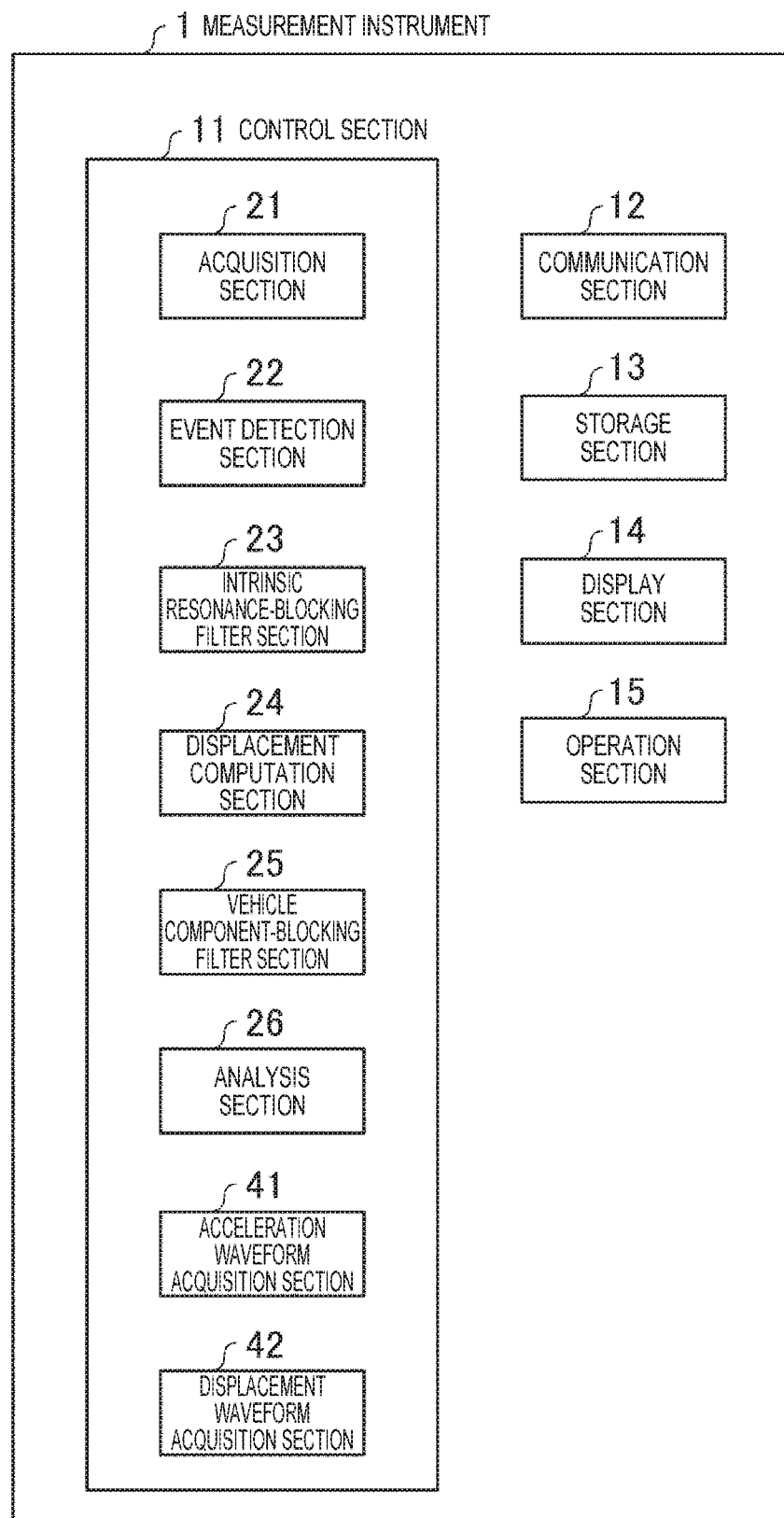
FIG. 22 is a view illustrating an example of functional blocks of a measurement instrument according to a second embodiment.

FIG. 22 is a view illustrating an example of the functional blocks of the measurement instrument 1 according to a second embodiment. In FIG. 22, the same components as in FIG. 4 are given the same reference sign and will not be described again. As illustrated in FIG. 22, the measurement instrument 1 has an acceleration waveform acquisition unit 41 and a displacement waveform acquisition unit 42.

In a case in which an event is detected using the event detection unit 22, the acceleration waveform acquisition unit 41 acquires the characteristic information of the waveform of width-direction acceleration generated by the event. Although described below in detail, the characteristic information is about, for example, the crest value, wave amplitude, and waveform coefficient of the width-direction acceleration and a time at which the vehicle passes through the acceleration sensor 2. The acceleration waveform acquisition unit 41 stores the acquired characteristic information of the width-direction acceleration in the storage unit 13.

The waveform of the width-direction acceleration generated by the event has an approximately trapezoidal shape. Therefore, even when not all the data of the width-direction acceleration generated by the event is stored in the storage unit 13, it is possible to execute the approximate restoration of the waveform of the width-direction acceleration in a trapezoidal shape by storing the characteristic information in the storage unit 13. That is, the analysis unit 26 is capable of restoring trapezoidal width-direction acceleration from the characteristic information stored in the storage unit 13 and is capable of analyzing the motion of the vehicle 5, for example, even later on according to users' request and the like.

Figure 23:
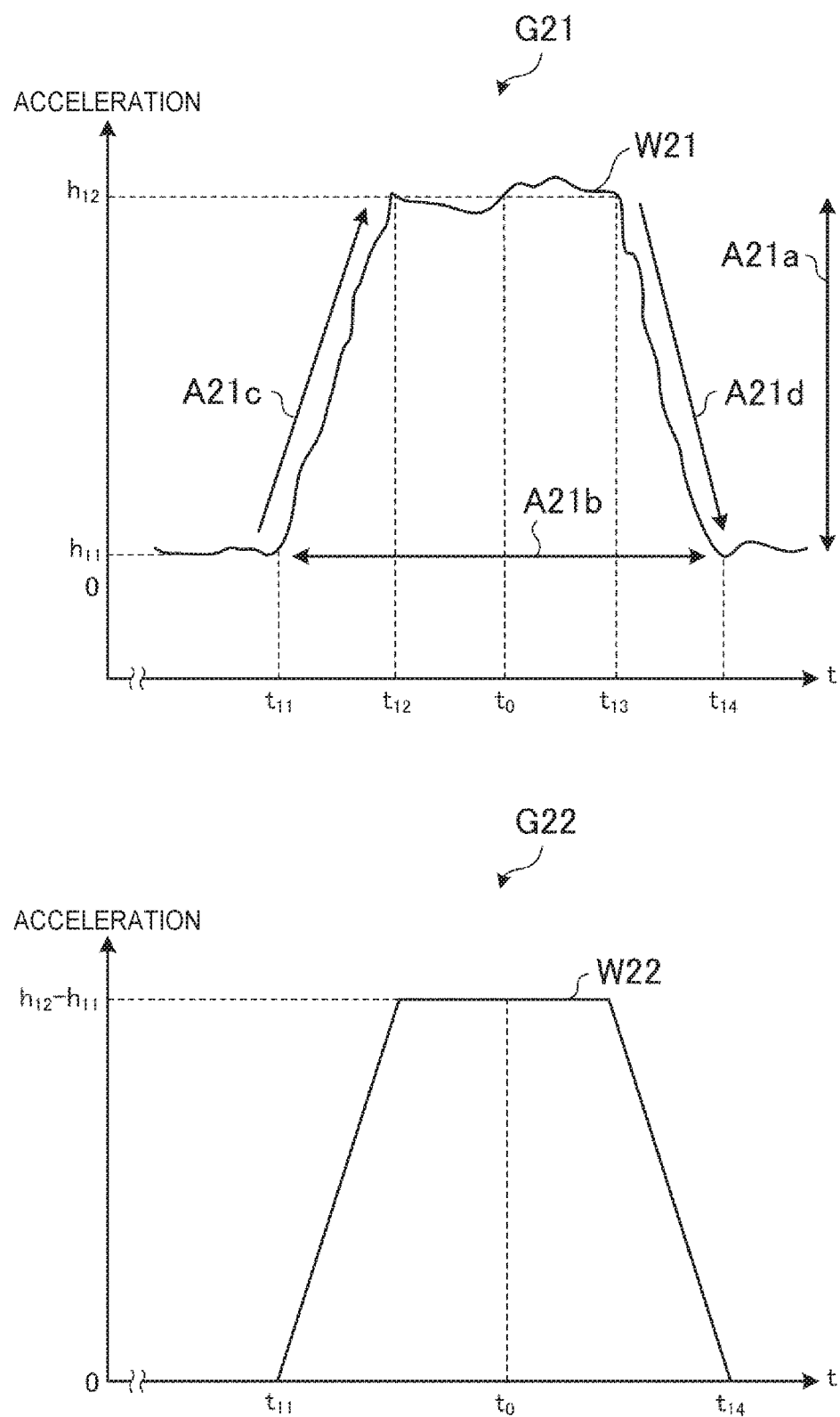
FIG. 23 is a view illustrating characteristic information of width-direction acceleration and restoration of the width-direction acceleration from the characteristic information.

FIG. 23 is a view illustrating the characteristic information of the width-direction acceleration and the restoration of the width-direction acceleration from the characteristic information. For graphs G21 and G22 illustrated in FIG. 23, the horizontal axis indicates time, and the vertical axis indicates acceleration.

A waveform W21 illustrated in the graph G21 indicates width-direction acceleration generated by the event. A waveform W22 illustrated in the graph G22 indicates width-direction acceleration restored from the characteristic information stored in the storage unit 13.

The acceleration waveform acquisition unit 41 acquires the characteristic information of the waveform W21. For example, the acceleration waveform acquisition unit 41 acquires the crest value indicated by an arrow A21a in the graph G21 and the wave amplitude indicated by an arrow A21b. In addition, the acceleration waveform acquisition unit 41 acquires the waveform coefficient indicated by an arrow A21c (the slope of the increasing width-direction acceleration) and the waveform coefficient indicated by an arrow A21d (the slope of the decreasing width-direction acceleration). In addition, the acceleration waveform acquisition unit 41 acquires a time $t_0$ at which the vehicle 5 passes through the acceleration sensor 2.

The crest value of the width-direction acceleration is regarded as, for example, a difference between a value $h_{11}$ at which the crest value of the width-direction acceleration before the event is almost constant and a value $h_{12}$ at which the crest value of the width-direction acceleration during the event peaks and is expressed as the following expression.

Crest value=$h_{12}$-$h_{11}$

The value $h_{11}$ may be set to "0".

The wave amplitude is regarded as, for example, a difference between a time $t_{11}$ at which the crest value of the width-direction acceleration begins to increase and a time $t_{14}$ at which the crest value of the width-direction acceleration stops to decrease and is expressed as the following expression.

Wave amplitude=$t_{14}$-$t_{11}$

The waveform coefficient of the increasing width-direction acceleration is regarded as, for example, the slope of the width-direction acceleration obtained from the time $t_{11}$ at which the crest value of the width-direction acceleration begins to increase, a time $t_{12}$ at which the width-direction acceleration reaches the value $h_{12}$, and the crest value and is expressed as the following expression.

Waveform coefficient=$(h_{12}-h_{11})/(t_{12}-t_{11})$

The waveform coefficient of the decreasing width-direction acceleration is regarded as, for example, the slope of the width-direction acceleration obtained from a time $t_{13}$ at which the crest value of the width-direction acceleration during the event begins to decrease, the time $t_{14}$ at which the width-direction acceleration reaches the value $h_{11}$, and the crest value and is expressed as the following expression.

Waveform coefficient=$(h_{11}-h_{12})/(t_{14}-t_{13})$

The time $t_0$ at which the vehicle 5 passes through the acceleration sensor 2 is regarded as, for example, a time at which the crest value of the vertical-direction displacement is maximized (for example, refer to the time to in FIGS. 10 and 11).

The definition of the characteristic information is not limited thereto. For example, the crest value may be regarded as the maximum value of the crest value of the width-direction acceleration generated by the event. In addition, the wave amplitude may be regarded as a difference between a time at which the crest value of the width-direction acceleration generated by the event exceeds a predetermined threshold value his and a time at which the crest value turns to be below the predetermined threshold value $h_{13}$.

The acceleration waveform acquisition unit 41 stores the acquired characteristic information in the storage unit 13. In such a case, the analysis unit 26 is capable of restoring the width-direction acceleration generated by the event as a trapezoidal waveform as indicated by the waveform W22 from the characteristic information stored in the storage unit 13. For example, the analysis unit 26 increases the width-direction acceleration up to the crest value "$h_{12}$-$h_{11}$" using the waveform coefficient of the increasing width-direction acceleration and the time $t_{11}$ which is a time traced back from the time $t_0$ by half the wave amplitude as a starting point. In addition, the analysis unit 26 increases the width-direction acceleration up to the crest value "$h_{12}$-$h_{11}$" using the waveform coefficient of the decreasing width-direction acceleration and the time $t_{14}$ which is a time traced back from the time $t_0$ by half the wave amplitude as a starting point. In addition, the analysis unit 26 restores the width-direction acceleration generated by the event by connecting two points at times at which the width-direction acceleration is increased up to the crest value.

The acceleration waveform acquisition unit 41 is also capable of acquiring the waveform W7 illustrated in FIG. 15 or the characteristic information of the waveform W9b illustrated in FIG. 19 and storing them in the storage unit 13. For example, the acceleration waveform acquisition unit 41 captures the waveform W7 or the waveform W9b as a waveform of a combination of two trapezoids, acquires characteristic information, and stores the characteristic information in the storage unit 13.

Description will continue with reference to FIG. 22. In a case in which an event is detected using the event detection unit 22, the displacement waveform acquisition unit 42 acquires the characteristic information of the waveform of vertical-direction displacement generated by the event. Although described below in detail, the characteristic information is about, for example, the crest value and wave amplitude of the vertical-direction displacement and a time at which the vehicle 5 passes through the acceleration sensor 2. The displacement waveform acquisition unit 42 stores the acquired characteristic information of the vertical-direction displacement in the storage unit 13.

The waveform of the vertical-direction displacement generated by the event is approximated using Expression (1) below.

$$u(t) = h_u \cdot a^{-\left(\frac{t-t_0}{w_u}\right)^2} \qquad (1)$$

In Expression (1), "$h_u$" represents the crest value of the vertical-direction displacement, and "$w_u$" represents the wave amplitude of the vertical-direction displacement. "$t_0$" represents the time at which the vehicle 5 passes through the acceleration sensor 2 and, for example, a time at which the vertical-direction displacement during the event reaches the minimum value. "a" represents the waveform coefficient and a constant determined by the floor slab 4d.

Therefore, even when not all the data of the vertical-direction displacement generated by the event is stored in the storage unit 13, it is possible to restore the waveform of the vertical-direction displacement from Expression (1) by storing the characteristic information in the storage unit 13. That is, the analysis unit 26 is capable of restoring the vertical-direction displacement from the characteristic information stored in the storage unit 13 and is capable of analyzing the motion of the vehicle 5, for example, even later on according to users' request and the like.

Figure 24:
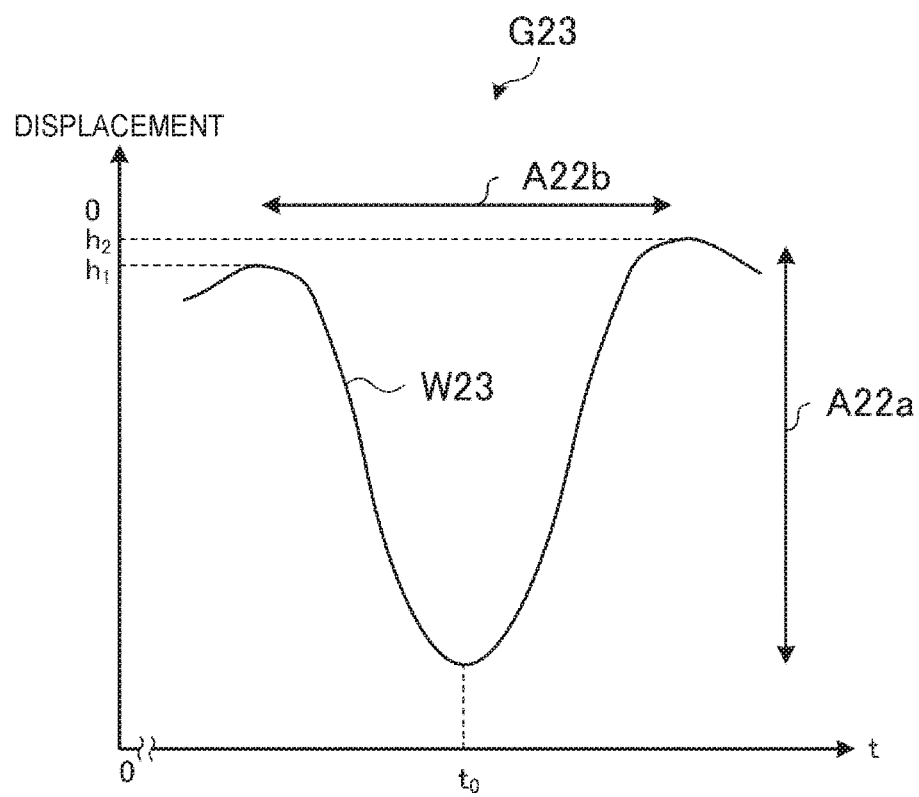
FIG. 24 is a view illustrating characteristic information of vertical-direction displacement and restoration of the vertical-direction displacement from the characteristic information.
Figure 24:
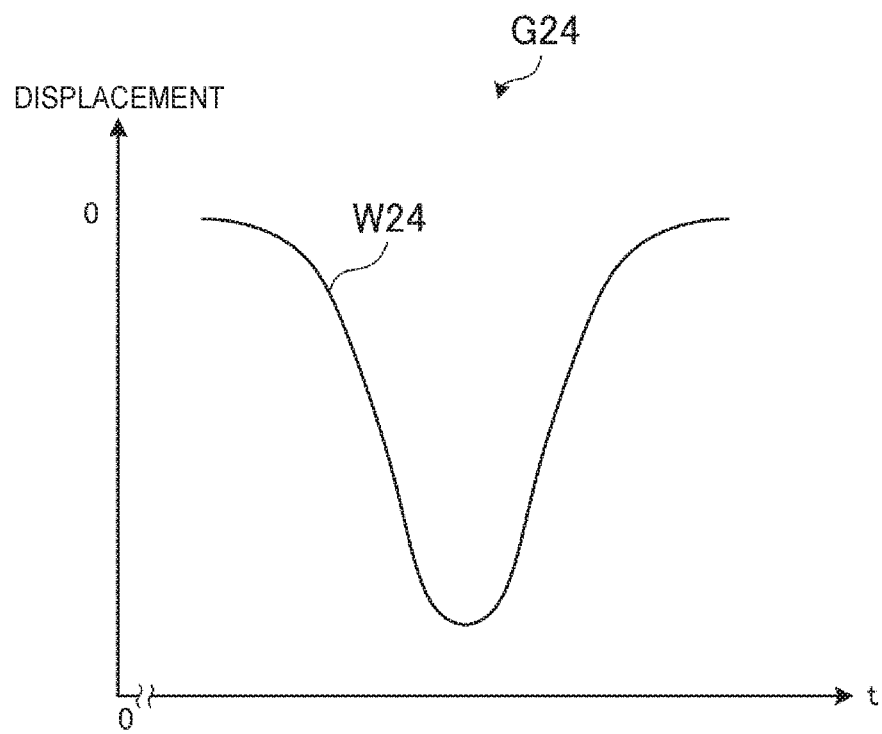

FIG. 24 is a view illustrating the characteristic information of the vertical-direction displacement and the restoration of the vertical-direction displacement from the characteristic information. For graphs G23 and G24 illustrated in FIG. 24, the horizontal axis indicates time, and the vertical axis indicates displacement.

A waveform W23 illustrated in the graph G23 indicates the vertical-direction displacement generated by the event. A waveform W24 illustrated in the graph G24 indicates the vertical-direction displacement restored from the characteristic information stored in the storage unit 13.

The displacement waveform acquisition unit 42 acquires the characteristic information of the waveform W23. For example, the displacement waveform acquisition unit 42 acquires the crest value indicated by an arrow A22a in the graph G23 and the wave amplitude indicated by an arrow A22b. In addition, the displacement waveform acquisition unit 42 acquires the time $t_0$ at which the vehicle 5 passes through the acceleration sensor 2.

The crest value of the vertical-direction displacement is regarded as, for example, a difference between an extreme value $h_2$ which is a larger one of an extreme value $h_1$ of the vertical-direction displacement before the time $t_0$ at which the vertical-direction displacement during the event is minimized and the extreme value $h_2$ of the vertical-direction displacement after the time $t_0$ at which the vertical-direction displacement is minimized and the minimum value $h_0$ of the vertical-direction displacement during the event. The definition of the crest value of the vertical-direction displacement is not limited thereto, and, for example, the minimum value $h_0$ of the vertical-direction displacement during the event may be regarded as the crest value. The wave amplitude of the vertical-direction displacement is the same as the wave amplitude described using FIG. 10 and will not be described again.

The displacement waveform acquisition unit 42 stores the acquired characteristic information in the storage unit 13. In such a case, the analysis unit 26 is capable of restoring the vertical-direction displacement generated by the event as a waveform as indicated by the waveform W24 using the characteristic information stored in the storage unit 13 and Expression (1). For example, the analysis unit 26 substitutes the crest value "$h_u$" stored in the storage unit 13, the wave amplitude "$w_u$", and the time "to" at which the vehicle 5 passes through the acceleration sensor 2 into Expression (1). In such a case, the analysis unit 26 is capable of restoring the vertical-direction displacement generated by the event and is capable of analyzing the motion of the vehicle 5, for example, even later on according to users' request and the like.

The waveform coefficient "a" in Expression (1) is computed in advance for every floor slab 4d. For example, the actual measurement values of the crest value and wave amplitude of the vertical-direction displacement and the time at which the vehicle 5 passes through the acceleration sensor 2 are substituted into Expression (1). In addition, the waveform coefficient "a" is computed in advance so that the waveform in Expression (1) is most approximated to the waveform of actual vertical-direction displacement by comparing the waveform indicated by Expression (1) and the waveform of actual vertical-direction displacement when actual values are measured.

The displacement waveform acquisition unit 42 is also capable of acquiring the asymmetric waveform W4 as illustrated in FIG. 11 and storing the waveform in the storage unit 13. For example, the acceleration waveform acquisition unit 41 divides the waveform W4 into two waveforms using the time $t_0$ as a boundary, respectively acquires the characteristic information thereof, and stores the characteristic information in the storage unit 13.

The flowchart of the measurement instrument 1 according to the second embodiment is identical to that in FIG. 21. However, at least after the process of Step S2, a storage process of the characteristic information of the waveforms is executed using the acceleration waveform acquisition unit 41 and the displacement waveform acquisition unit 42.

In the measurement instrument 1 according to the second embodiment, the processes of vehicle motion analysis of Steps S5 to S9 may not be executed. The processes of vehicle motion analysis may be executed according to, for example, user's request and the like. For example, when a user makes an analysis request, the analysis unit 26 acquires the characteristic information stored in the storage unit 13 and restores horizontal-direction acceleration and vertical-direction displacement which are generated by the event from the acquired characteristic information. In addition, the analysis unit 26 may analyze the motion of the vehicle 5 from the horizontal-direction acceleration and vertical-direction displacement which have been restored.

As described above, the acceleration waveform acquisition unit 41 acquires the characteristic information of the waveform of the width-direction acceleration generated by the event. In addition, the displacement waveform acquisition unit 42 acquires the characteristic information of the waveform of the vertical-direction displacement generated by the event. In such a case, the storage unit 13 is capable of reducing storage capacity.

In addition, the analysis unit 26 is capable of restoring the width-direction acceleration or the vertical-direction displacement from the characteristic information stored in the storage unit 13 and is thus capable of analyzing the motion of the vehicle 5 on the floor slab 4d, for example, even later on according to users' request and the like.

The acceleration waveform acquisition unit 41 may acquire the characteristic information of the width-direction acceleration that is output from the acceleration sensor 2 and store the characteristic information in the storage unit 13 or may acquire the characteristic information of the width-direction acceleration that has been filtered using the intrinsic resonance-blocking filter unit 23 and the vehicle component-blocking filter unit 25 and store the characteristic information in the storage unit 13. In addition, the acceleration waveform acquisition unit 41 may acquire the characteristic information of the width-direction acceleration that has been filtered using the intrinsic resonance-blocking filter unit 23 and the vehicle component-blocking filter unit 25 and store the characteristic information in the storage unit 13.

Third Embodiment

The acquisition unit 21 may acquire the travelling-direction acceleration (y-axis direction acceleration) of the floor slab 4d which is output from the acceleration sensor 2. In addition, the analysis unit 26 may analyze the motion of the vehicle 5 on the basis of the travelling-direction acceleration acquired using the acquisition unit 21.

Figure 25:
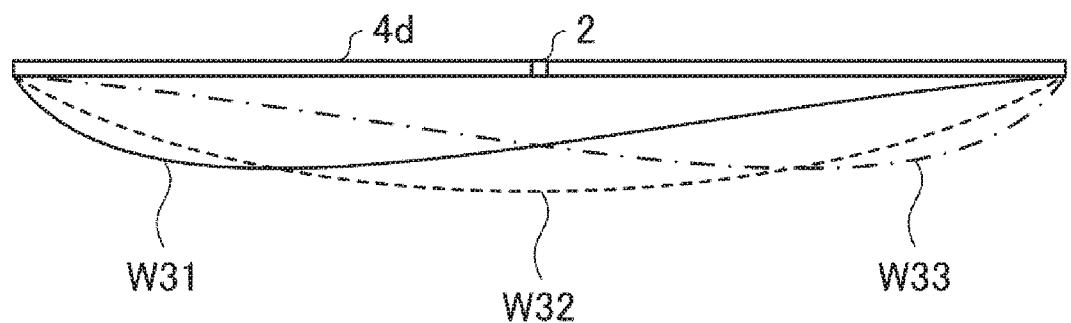
FIG. 25 is a view illustrating travelling-direction acceleration of a floor slab according to a third embodiment.

FIG. 25 is a view illustrating travelling-direction acceleration of a floor slab according to a third embodiment. FIG. 25 illustrates the floor slab 4d seen from the horizontal direction. In addition, FIG. 25 illustrates the acceleration sensor 2 mounted on the floor slab 4d.

A waveform W31 of a solid line illustrated in FIG. 25 indicates the bending of the floor slab 4d when the vehicle 5 passes through the left side on the center (the acceleration sensor 2) of the floor slab 4d in FIG. 25. A waveform W32 of a dashed line indicates the bending of the floor slab 4d when the vehicle 5 passes through the center of the floor slab 4d in FIG. 25. A waveform W33 of a dot-dashed line indicates the bending of the floor slab 4d when the vehicle 5 passes through the right side on the center of the floor slab 4d in FIG. 25.

Figure 26:
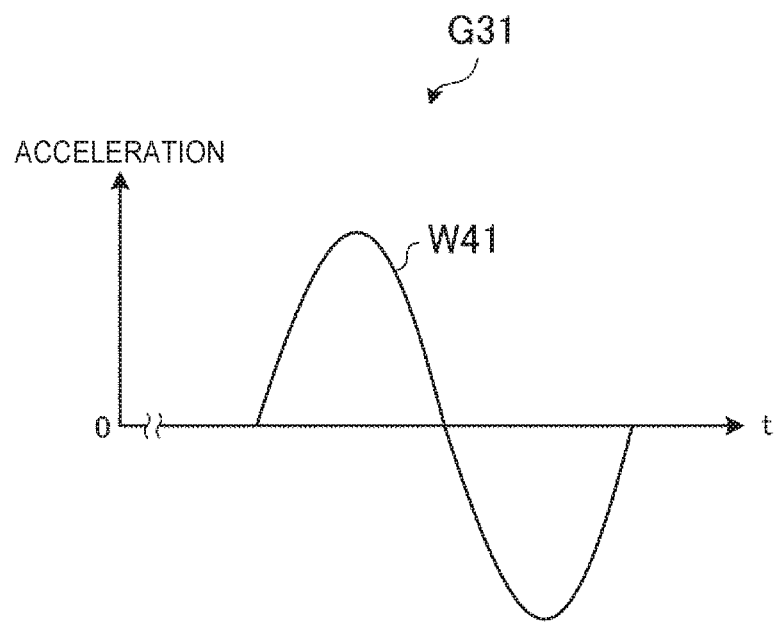
FIG. 26 is a view illustrating a temporal change of travelling-direction acceleration.
Figure 26:
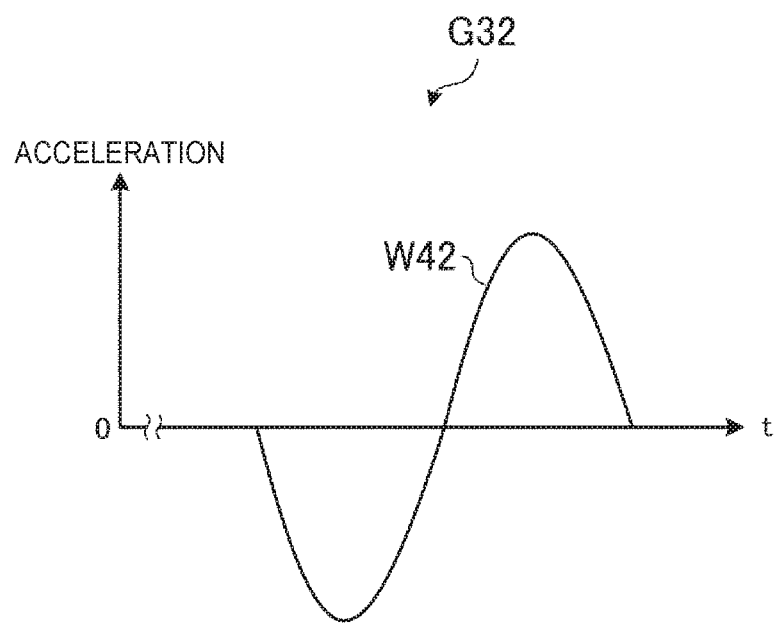

FIG. 26 is a view illustrating a temporal change of travelling-direction acceleration. For graphs G31 and G32 illustrated in FIG. 26, the horizontal axis indicates time, and the vertical axis indicates acceleration.

A waveform W41 in the graph G31 indicates a change in the travelling-direction acceleration when the vehicle 5 passes through on the floor slab 4d from the left side to the right side in FIG. 25. A waveform W42 in the graph G32 indicates a change in the travelling-direction acceleration when the vehicle 5 passes through on the floor slab 4d from the right side to the left side in FIG. 25. In the graphs G31 and G32, when the y axis of the acceleration sensor 2 is oriented upward with respect to the horizontal direction, the sign of the travelling-direction acceleration is set to be "positive".

A case in which the vehicle 5 enters the floor slab 4d through the left side and leaves the floor slab through the right side in FIG. 25 will be considered. When the vehicle 5 runs toward the center from the left end of the floor slab 4d, the floor slab 4d bends as indicated by the waveform W31 in FIG. 25. Therefore, the y axis of the acceleration sensor 2 is oriented upwards with respect to the horizontal direction and has a "positive" value. Subsequently, when the vehicle 5 passes through the center of the floor slab 4d, the floor slab 4d bends as indicated by the waveform W32 in FIG. 25. Therefore, the y axis of the acceleration sensor 2 is oriented along the horizontal direction and has a "0" value. Subsequently, when the vehicle 5 runs toward the right end from the center of the floor slab 4d, the floor slab 4d bends as indicated by the waveform W33 in FIG. 25. Therefore, the y axis of the acceleration sensor 2 is oriented downwards with respect to the horizontal direction and has a "negative" value. That is, in a case in which the vehicle 5 enters the floor slab 4d through the left side and leaves the floor slab through the right side, the travelling-direction acceleration changes as indicated by the waveform W41.

A case in which the vehicle 5 enters the floor slab 4d through the right side and leaves the floor slab through the left side in FIG. 25 will be considered. When the vehicle 5 runs toward the center from the right end of the floor slab 4d, the floor slab 4d bends as indicated by the waveform W33 in FIG. 25. Therefore, the y axis of the acceleration sensor 2 is oriented downwards with respect to the horizontal direction and has a "negative" value. Subsequently, when the vehicle 5 passes through the center of the floor slab 4d, the floor slab 4d bends as indicated by the waveform W32 in FIG. 25. Therefore, the y axis of the acceleration sensor 2 is oriented along the horizontal direction and has a "0" value. Subsequently, when the vehicle 5 runs toward the left end from the center of the floor slab 4d, the floor slab 4d bends as indicated by the waveform W31 in FIG. 25. Therefore, the y axis of the acceleration sensor 2 is oriented upwards with respect to the horizontal direction and has a "positive" value. That is, in a case in which the vehicle 5 enters the floor slab 4d through the right side and leaves the floor slab through the left side, the travelling-direction acceleration changes as indicated by the waveform W42.

As indicated by the waveforms W41 and W42, the sign of the travelling-direction acceleration changes depending on the entering direction of the vehicle 5 into the floor slab 4d. Therefore, the analysis unit 26 is capable of analyzing the entering direction of the vehicle 5 into the floor slab 4d on the basis of the sign of the travelling-direction acceleration.

In addition, the wave amplitude of the travelling-direction acceleration changes depending on the passing duration of the vehicle 5 on the floor slab 4d. For example, as the passing duration of the vehicle 5 on the floor slab 4d increases, the wave amplitude between the crest and trough or the trough and crest of the travelling-direction acceleration increases. Therefore, the analysis unit 26 is capable of analyzing the passing duration of the vehicle 5 on the floor slab 4d on the basis of the wave amplitude of the travelling-direction acceleration.

As described above, the analysis unit 26 is capable of analyzing the motion of the vehicle 5 on the basis of travelling-direction acceleration.

Hitherto, the invention has been described using embodiments, but the functional constitution of the measurement instrument has been classified in accordance with the main processing contents in order to facilitate the understanding of the constitution of the measurement instrument. The method or name of the classification of constituent elements is not limited by the invention of the present application. The constitution of the measurement instrument can also be classified into a larger number of constituent elements in accordance with processing contents. In addition, the constitution can also be classified so that a single constituent element executes more processes. In addition, the number of kinds of hardware used to execute the processes of the respective constituent elements may be one or multiple.

In addition, the technical scope of the invention is not limited to the scopes described in the above-described embodiments. It is clear to persons in the art that a variety of changes or improvements can be added to the embodiments. In addition, it is clear from the scope of the appended claim that aspects obtained by adding the above-described changes or improvements to the embodiments can also be included in the technical scope of the invention. In addition, the invention can also be provided in a form of a measurement method, a program for measurement instruments, or a storage medium in which the program is stored.

What is claimed is:

1. A movable object information obtaining system comprising:
   three axes orthogonal to each other being defined as an X axis, a Y axis, and a Z axis;
   an acceleration sensor that is disposed on a side of a bridge deck, the bridge deck extending along a plane having the Y axis and the Z axis, a movable object being movable on a surface of the bridge deck in a direction along the Y axis, the bridge deck being movable along the X axis when the movable object moves on the surface of the bridge deck, the acceleration sensor being configured to detect vertical direction acceleration of the bridge deck along the X axis and to detect width direction acceleration of the bridge deck along the Z axis;
   a memory configured to store computer-readable instructions; and
   a processor configured to execute the computer-readable instructions so as to:
      obtain first sensor data corresponding to the vertical direction acceleration from the acceleration sensor;
      compute a vertical direction displacement of the bridge deck according to the obtained first sensor data;
      obtain second sensor data corresponding to the width direction acceleration from the acceleration sensor; and
      determine a stoppage of the movable object on the bridge deck based on the computed vertical direction displacement of the bridge deck and the obtained second sensor data,
   wherein the acceleration sensor is configured to detect a Z axis component along the Z axis of gravity acceleration due to an inclination of the surface of the bridge deck when the movable object moves on the surface of the bridge deck, and the Z axis component of the gravity acceleration corresponds to the width direction acceleration, and the acceleration sensor is configured to detect the vertical direction acceleration along the X axis due to the inclination of the surface of the bridge deck caused by a weight of the movable object.

2. The movable object information obtaining system according to claim 1,
wherein the processor is configured to determine the stoppage of the movable object on the bridge deck based on wave amplitude of the width direction acceleration and wave amplitude of the computed vertical direction displacement.

3. The movable object information obtaining system according to claim 2,
wherein the processor is configured to calculate a passing duration of the movable object on the bridge deck based on the vertical direction displacement.

4. The movable object information obtaining system according to claim 3,
wherein the processor is configured to calculate the passing duration based on wave amplitude of the vertical direction displacement.

5. The movable object information obtaining system according to claim 4,
wherein the processor is configured to divide the wave amplitude of the vertical direction displacement into multiple sections and calculate the passing duration corresponding to each of the multiple sections.

6. The movable object information obtaining system according to claim 2,
wherein the processor is configured to determine the stoppage of the movable object when the wave amplitude of the width direction acceleration is larger by a predetermined value than the wave amplitude of the vertical direction displacement.

7. The movable object information obtaining system according to claim 2,
wherein the processor is configured to determine a stop time of the movable object on the bridge deck based on a peak time of the vertical direction displacement and a time at which the wave amplitude of the width direction acceleration is terminated.

8. The movable object information obtaining system according to claim 2,
wherein the processor is configured to moving determine direction changes of the movable object on the bridge deck based on the width direction acceleration.

9. The movable object information obtaining system according to claim 8,
wherein the processor is configured to determine the moving direction changes of the movable object based on a degree and a positive-negative sign of a crest value of the width direction acceleration.

10. The movable object information obtaining system according to claim 1,
wherein the acceleration sensor is disposed on a center of the side of the bridge deck along the Y axis.

11. The movable object information obtaining system according to claim 1,
wherein the processor is configured to determine an entering direction of the movable object onto the bridge deck based on the width direction acceleration and an envelope curve of the width direction acceleration.

12. The measurement movable object information obtaining system according to claim 11,
wherein the processor is configured to determine the entering direction of the movable object based on an appearance time of the envelope curve with respect to the width direction acceleration.

13. The measurement movable object information obtaining system according to claim 12,
wherein the processor is configured to determine the entering direction of the movable object based on a state in which the envelope curve appears before the width direction acceleration appears and a state in which the envelope curve appears after the width direction acceleration does not appear any longer.

14. The measurement movable object information obtaining system according to claim 11,
wherein the processor is configured to suppress acceleration components which are included in the width direction acceleration that is computed by the envelope curve and is generated due to movement of the movable object on the bridge deck.

15. The measurement movable object information obtaining system according to claim 1,
wherein the processor is configured to obtain first characteristic information of waveforms of the width direction acceleration and store the first characteristic information in the memory.

16. The movable object information obtaining system according to claim 1,
wherein the processor is configured to obtain second characteristic information of waveforms of the vertical direction displacement and store the second characteristic information in the memory.

17. The movable object information obtaining system according to claim 1,
wherein the processor is configured to output analysis results of motion of the movable object.

18. The movable object information obtaining system according to claim 1,
wherein the processor is configured to suppress intrinsic resonance frequency components which are included in the width direction acceleration with respect to the bridge deck.

* * * * *